US012179501B2

(12) United States Patent
Fujii

(10) Patent No.: US 12,179,501 B2
(45) Date of Patent: Dec. 31, 2024

(54) LIQUID EJECTING DEVICE

(71) Applicant: SEIKO EPSON CORPORATION, Tokyo (JP)

(72) Inventor: Hirokazu Fujii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 159 days.

(21) Appl. No.: 18/158,059

(22) Filed: Jan. 23, 2023

(65) Prior Publication Data

US 2023/0234384 A1 Jul. 27, 2023

(30) Foreign Application Priority Data

Jan. 25, 2022 (JP) ................................ 2022-009049

(51) Int. Cl.

| | |
|---|---|
| ***B41J 29/377*** | (2006.01) |
| ***B41J 11/00*** | (2006.01) |
| ***B41J 15/04*** | (2006.01) |
| ***B41J 29/38*** | (2006.01) |
| *B41J 3/407* | (2006.01) |

(52) U.S. Cl.

CPC ....... *B41J 29/377* (2013.01); *B41J 11/00222* (2021.01); *B41J 11/00242* (2021.01); *B41J 11/007* (2013.01); *B41J 15/048* (2013.01); *B41J 29/38* (2013.01); *B41J 3/4078* (2013.01); *B41J 11/0021* (2021.01)

(58) Field of Classification Search

CPC ...... B41J 29/377; B41J 3/4078; B41J 15/048; B41J 11/0021; B41J 11/00222; B41J 11/00242; B41J 11/007; B41J 29/38

See application file for complete search history.

(56) References Cited

U.S. PATENT DOCUMENTS 5,512,924 A * 4/1996 Takada .................. B41J 29/377 347/18
2009/0174735 A1* 7/2009 Yamada ............... B41J 2/17596 347/7
2011/0254904 A1* 10/2011 Miura ...................... B41J 29/38 347/85
2021/0229469 A1 7/2021 Asamoto

FOREIGN PATENT DOCUMENTS

JP 2021-115817 A 8/2021

* cited by examiner

*Primary Examiner* — Henok D Legesse

(74) *Attorney, Agent, or Firm* — WORKMAN NYDEGGER

(57) ABSTRACT

A liquid ejecting device includes an ejecting head configured to eject liquid to a medium, a conveyance belt including an adhesive layer to which the medium is bondable, the conveyance belt being configured to convey the medium with the adhesive layer, a heating unit configured to heat the conveyance belt, a pressing unit configured to press the medium against the conveyance belt heated by the heating unit, a channel member configured to define a channel of the liquid to be supplied to the ejecting head, an airflow generation unit configured to generate airflow to be jetted to the conveyance belt past the pressing unit, and a heat exchange mechanism configured to exchange heat between a heat absorption unit configured to absorb heat and a heat dissipation unit configured to emit heat. The heat dissipation unit makes contact with the channel member, and the heat absorption unit is disposed in a course of an airway path through which the airflow moves.

7 Claims, 9 Drawing Sheets

LIQUID EJECTING DEVICE

The present application is based on, and claims priority from JP Application Serial Number 2022-009049, filed Jan. 25, 2022, the disclosure of which is hereby incorporated by reference herein in its entirety.

BACKGROUND

1. Technical Field

The present disclosure relates to a liquid ejecting device that performs printing by ejecting liquid onto a medium.

2. Related Art

The recording device disclosed in JP-A-2021-115817 includes a conveyance belt that conveys a medium with an adhesive layer that adheres to the medium, a heating unit that heats the conveyance belt, a pushing unit that presses the medium against the adhesive layer, and a recording unit that performs recording on the medium being conveyed. Since the heating unit heats the conveyance belt in advance, the adhesive layer is softened, and the medium easily makes intimate contact with the conveyance belt when the pressing unit presses the medium against the adhesive layer. The recording unit performs printing on a medium whose floating is suppressed by the pushing unit. The pushing unit is an example of the pressing unit, and the recording unit is an example of the ejecting head.

Depending on the material of the conveyance belt, the conveyance belt may be degraded if the state where the conveyance belt is heated by the heating unit and the temperature of the conveyance belt is at high temperature continues. That is, the durability of the conveyance belt may be degraded. In view of this, it is conceivable to apply a means for cooling the conveyance belt with outside air, for example. However, the ability to cool the conveyance belt with outside air is influenced by the temperature of the installation environment, and as such colling of the conveyance belt with outside air alone may not achieve a sufficient cooling effect.

SUMMARY

A liquid ejecting device for solving the above-mentioned problems includes an ejecting head configured to eject liquid to a medium, a conveyance belt including an adhesive layer to which the medium is bondable, the conveyance belt being configured to convey the medium with the adhesive layer, a heating unit configured to heat the conveyance belt, a pressing unit configured to press the medium against the conveyance belt heated by the heating unit, a channel member configured to define a channel of the liquid to be supplied to the ejecting head, an airflow generation unit configured to generate airflow to be jetted to the conveyance belt past the pressing unit, and a heat exchange mechanism configured to exchange heat between a heat absorption unit configured to absorb heat and a heat dissipation unit configured to emit heat. The heat dissipation unit makes contact with the channel member, and the heat absorption unit is disposed in a course of an airway path through which the airflow moves.

DESCRIPTION OF EXEMPLARY EMBODIMENTS

Figure 1:
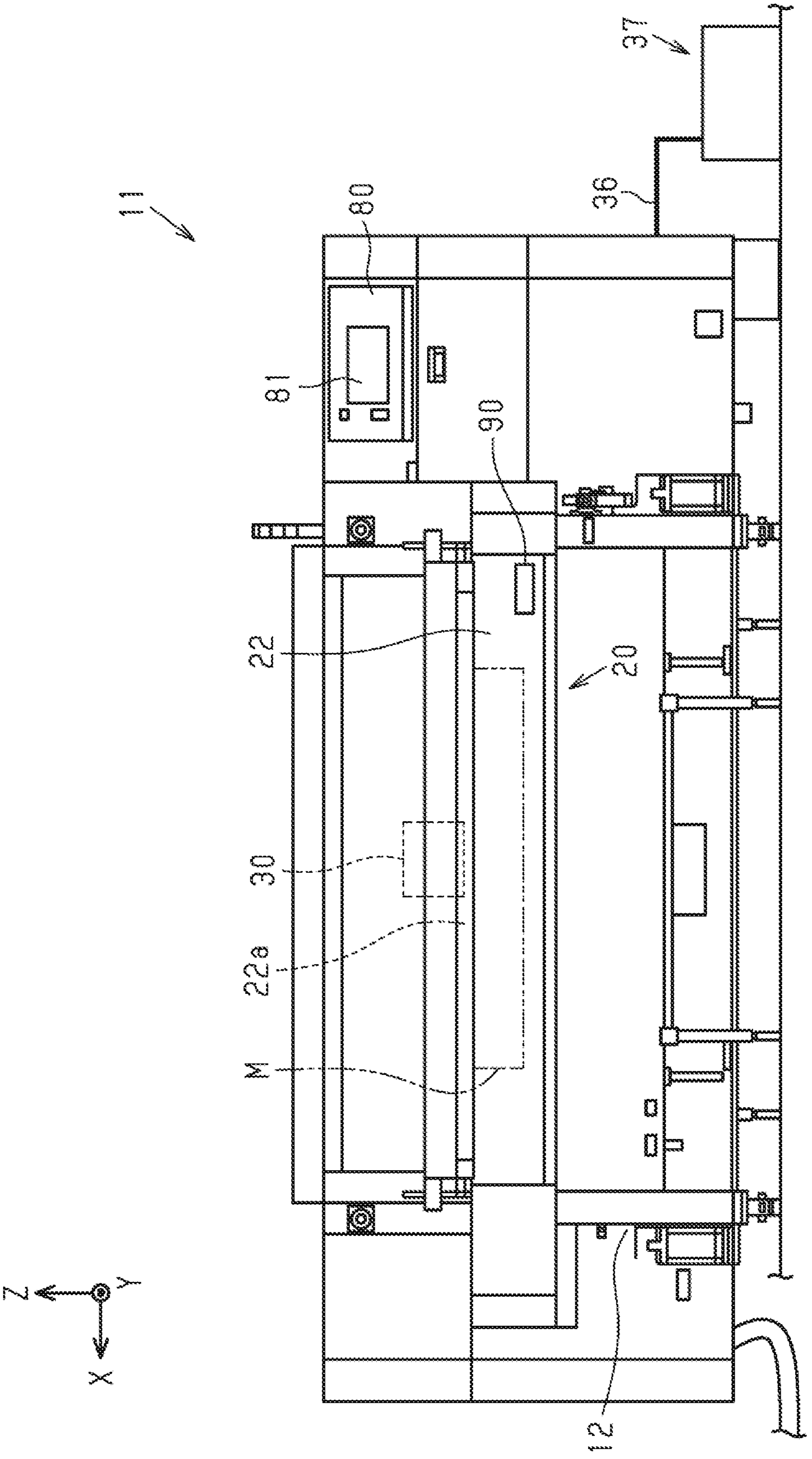
FIG. 1 is a front view illustrating a liquid ejecting device according to first and second embodiments.

A liquid ejecting device of a first embodiment that performs printing by ejecting liquid onto a medium is described below with reference to the drawings. The liquid ejecting device is an ink-jet printer that prints letters and images on a medium such as a sheet and fabric by ejecting ink as an example of liquid to the medium, for example.

In the drawings, the gravity direction is the Z axis and the direction along the horizontal plane is the X axis and the Y axis, assuming that the liquid ejecting device is placed on a horizontal plane. The X axis, Y axis, and Z axis are orthogonal to each other. In the following description, the direction along the X axis is referred to as width direction X, the direction along the Y axis is referred to as depth direction Y, and the direction along the Z axis is referred to as gravity direction Z. Note that the width direction X is the width direction X of the medium to be conveyed. In addition, the depth direction Y is also referred to as conveyance direction Y because the depth direction Y is the conveyance direction of the medium when printing is performed at a printing unit.

First Embodiment

Configuration of Liquid Ejecting Device

As illustrated in FIG. 1, a liquid ejecting device 11 includes a housing 12 with a post-and-beam structure, and an operation unit 80. The operation unit 80, which is operated by the user, includes a display unit 81 composed of a touch-panel liquid crystal screen and the like, an operation button, and the like, for example.

The liquid ejecting device 11 includes a conveyance unit 20 that conveys a medium M while supporting it with a support surface 22*a*, and a printing unit 30 that performs recording operation by ejecting liquid onto the medium M supported by the support surface 22*a*. The liquid ejecting device 11 includes a control unit 90 that controls the components of the liquid ejecting device 11 such as the conveyance unit 20 and the printing unit 30. The support surface 22*a* supports the medium M through an adhesive layer 25 described later.

Figure 2:
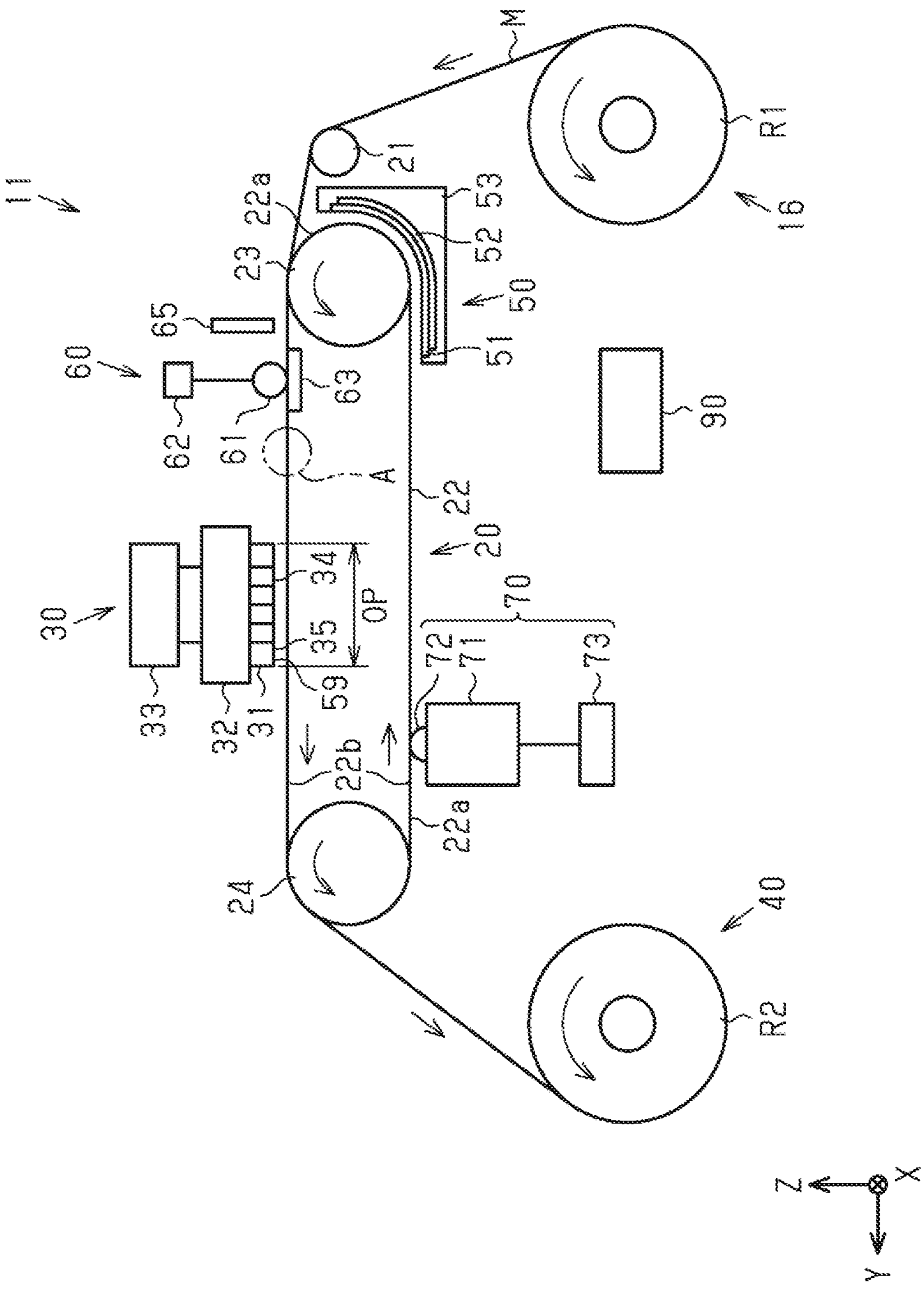
FIG. 2 is a schematic side view illustrating the liquid ejecting device of FIG. 1.

As illustrated in FIG. 2, the conveyance unit 20 includes a conveyance belt 22, a rotation roller 23, and a driving roller 24. The conveyance belt 22 is an endless belt wound around the rotation roller 23 disposed upstream of the printing unit 30 in the conveyance direction Y and the driving roller 24 disposed downstream of the printing unit 30 in the conveyance direction Y. The conveyance belt 22 is composed of rubber, for example. The conveyance belt 22 is held with a predetermined tensile force acting on it so that the region of the conveyance path between the rotation roller 23 and the driving roller 24 is horizontal.

The rotation roller 23 and the driving roller 24 support an inner peripheral surface 22*b* of the conveyance belt 22. The driving roller 24 includes a motor (not illustrated in the drawing) that drives the driving roller 24 into rotation. When the driving roller 24 rotates, the conveyance belt 22 rotates along with the rotation, and the rotation roller 23 rotates to follow the rotation of the conveyance belt 22.

When rotated by the driving roller 24 in the solid line arrow direction illustrated in FIG. 2, the conveyance belt 22 conveys the medium M supported by the support surface 22*a* in the solid line arrow direction illustrated in FIG. 2. With the conveyance belt 22, the medium M is conveyed in the conveyance direction Y at the printing unit 30, and an image is formed on the medium M at the printing unit 30.

The liquid ejecting device 11 includes a feeding unit 16 that feeds the medium M rolled in a roll form. The feeding unit 16 supports a roll body R1 composed of the rolled medium M such that the rotation axis direction of the roll body R1 is the width direction X. The feeding unit 16 feeds the medium M toward the conveyance unit 20 by rotating the roll body R1 in the solid line arrow direction illustrated in FIG. 2 with a rotational driving unit not illustrated in the drawing. The operation of the rotational driving unit is controlled by the control unit 90. A conveyance roller 21 relays the medium M fed from the feeding unit 16 to the conveyance belt 22. In this manner, the state of the medium M is set to a state where it is supported at the support surface 22*a* of the conveyance belt 22.

Figure 3:
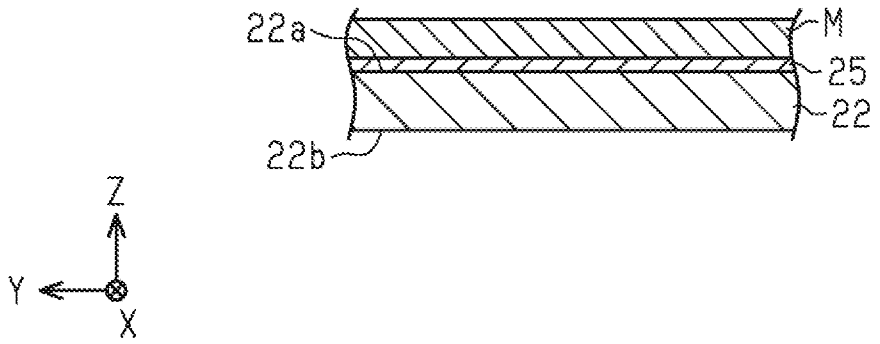
FIG. 3 is an enlarged view illustrating a part A illustrated in FIG. 2.

As illustrated in FIG. 3, in the conveyance belt 22, the outer peripheral surface is the support surface 22*a* that supports the medium M. The conveyance belt 22 includes the adhesive layer 25 configured to be able to bond the medium M with an adhesive applied on the support surface 22*a*.

As illustrated in FIG. 2, the liquid ejecting device 11 includes a heating unit 50 configured to be able to heat the conveyance belt 22, and a pressing unit 60 configured to be able to press the medium M against the conveyance belt 22 heated by the heating unit 50. The adhesive layer 25 of the conveyance belt 22 has adhesion when heated by the heating unit 50. The medium M fed by the feeding unit 16 is pressed by the pressing unit 60 against the adhesive layer 25. With the adhesive layer 25 and the medium M in intimate contact with each other, the conveyance belt 22 firmly supports the medium M. That is, the conveyance belt 22 is configured to be able to convey the medium M with the adhesive layer 25. In this manner, stretchable fabric and the like may be handled as a printable medium M. In addition, the medium M for which printing has been completed is peeled off from the conveyance belt 22. In this embodiment, fabrics such as cotton, silk, wool, artificial fiber and blended fabric may be used as the medium M. Note that the configuration of the heating unit 50 will be described later.

The route along which the conveyance belt 22 rotates in the solid line arrow direction illustrated in FIG. 2 is referred to as circumferential path. In the circumferential path, the path for conveying the medium M is a conveyance path, and the path that does not make up the conveyance path of the medium M is a conveyance preparation path. That is, the conveyance preparation path is the path other than the conveyance path in the circumferential path. Therefore, the conveyance path is the path from the position where the fed medium M is pressed against the conveyance belt 22 at the pressing unit 60 to the position where the medium M for which the printing has been completed is peeled off from the conveyance belt 22.

In the conveyance path, the support surface 22*a* of the rotating conveyance belt 22 supports the medium M on the side facing the printing unit 30, and the medium M is conveyed from the rotation roller 23 side to the driving roller 24 side. In addition, in the conveyance preparation path, the support surface 22*a* faces the heating unit 50 and a washing unit 70 described later as the conveyance belt 22 rotates. In this manner, in the conveyance preparation path, only the conveyance belt 22 including the adhesive layer 25, i.e., the conveyance belt 22 not supporting the medium M, moves from the driving roller 24 side to the rotation roller 23 side.

The pressing unit 60 is provided upstream of the printing unit 30 and downstream of the heating unit 50 in the conveyance direction Y of the conveyance belt 22. The pressing unit 60 includes a press roller 61, a press roller driving unit 62, and a roller supporting unit 63.

In this embodiment, the press roller 61 is formed in a cylindrical or cylindrical columnar shape extending in the width direction X, and is configured to be able to rotate in the circumferential direction along the cylindrical surface of the press roller 61. The roller supporting unit 63 is provided on the inner peripheral surface 22*b* side opposite to the press roller 61 with the conveyance belt 22 therebetween.

The length of the press roller 61 in the width direction X is approximately equal to the length of the conveyance belt 22 in the width direction X. The length of the medium M in the width direction X is smaller than the length of the press roller 61 and the conveyance belt 22 in the width direction X. The length of the roller supporting unit 63 in the width direction X is approximately equal to the length of the press roller 61 in the width direction X.

The press roller driving unit 62 presses the press roller 61 against the support surface 22*a* of the conveyance belt 22. The pressed press roller 61 rotates to follow the movement of the conveyance belt 22 in the conveyance direction Y. The medium M overlaid on the conveyance belt 22 is conveyed while being pressed against the conveyance belt 22 between the press roller 61 and the roller supporting unit 63. When the medium M is pressed against the adhesive layer 25 through the operation of the pressing unit 60 in the state where the conveyance belt 22 including the adhesive layer 25 and the medium M are sandwiched between the press roller 61 and the roller supporting unit 63, the medium M makes intimate contact with the support surface 22*a*. That is, the medium M is firmly supported at the support surface 22*a*.

The press roller 61 need not be used in the pressing unit 60 as long as the medium M can make intimate contact with the support surface 22*a* provided with the adhesive layer 25. For example, the pressing unit 60 may be configured such that the conveyance belt 22 is raised by a small diameter roller and/or a trapezoidal supporting part from the inner peripheral surface 22*b* side so as to form a protrusion on the support surface 22*a* side and press the surface of the medium M against the protrusion with the tensile force of the medium M.

The pressing unit 60 may have the function of the heating unit 50. For example, the medium M may be pressed by a heated pressing member against the conveyance belt 22. More specifically, the press roller 61 with a cylindrical shape may include a heater inside the cylindrical shape such that the press roller 61 is rotated while being heated with the heater from the inside of the cylindrical shape and that the medium M is pressed by the heated press roller 61 against the conveyance belt 22.

The liquid ejecting device 11 includes a winding unit 40 that winds up the printed medium M. By rotating a roll body R2 in the solid line arrow direction illustrated in FIG. 2 with the rotational driving unit not illustrated in the drawing, the winding unit 40 peels the medium M on which an image is formed from the adhesive layer 25 of the conveyance belt 22 and rolls the medium M. The winding unit 40 supports the roll body R2 composed of the rolled medium M such that the rotation axis direction of the roll body R2 is the width direction X. The operation of the rotational driving unit is controlled by the control unit 90.

As illustrated in FIG. 2, the printing unit 30 is disposed on the support surface 22*a* side, which is the upper side with respect to the conveyance belt 22 moving in the conveyance direction Y, and the printing unit 30 performs printing on the medium M supported by the support surface 22*a*. The printing unit 30 includes an ejecting head 31, a carriage 32 mounted in the ejecting head 31, and a carriage moving unit 33 that moves the carriage 32. The ejecting head 31 is configured to be able to eject liquid onto the medium M supported by the conveyance belt 22.

The ejecting head 31 includes a nozzle plate 35 in which a plurality of nozzle rows 34 are formed. For example, at least four nozzle rows 34 are formed in the nozzle plate 35. The ejecting head 31 is configured to be able to eject inks of different colors, such as cyan, magenta, yellow and black inks, of respective nozzle rows 34. The nozzle plate 35 faces the medium M conveyed by the conveyance belt 22.

The liquid ejecting device 11 may include a plurality of the ejecting heads 31. The liquid ejecting device 11 may include the ejecting head 31 that can eject cyan ink, the ejecting head 31 that can eject magenta ink, the ejecting head 31 that can eject yellow ink, and the ejecting head 31 that can eject black ink, for example. In addition, the liquid ejecting device 11 may include a plurality of ejecting heads 31 that can eject cyan ink, a plurality of ejecting heads 31 that can eject magenta ink, a plurality of ejecting heads 31 that can eject yellow ink, and a plurality of ejecting heads 31 that can eject black ink.

The carriage moving unit 33 moves the ejecting head 31 in the width direction X. The carriage 32 in which the ejecting head 31 is mounted is supported by a guide rail (not illustrated in the drawing) disposed along the width direction X, and is thus configured to be able to move back and forth in the width direction X with the carriage moving unit 33.

The carriage moving unit 33 is provided with a motor (not illustrated in the drawing) as a power source for moving the carriage 32 along the X direction. When the motor is driven under the control of the control unit 90, the ejecting head 31 moves back and forth along the X direction together with the carriage 32.

In this embodiment, the ejecting head 31 mounted in the carriage 32 ejects liquid onto the medium M while moving in the width direction X of the medium M. That is, the ejecting head 31 of a serial head type is used. Note that the ejecting head 31 with the fixed position with respect to the width direction X may include a nozzle row spanning in the width direction X of the medium M. That is, the ejecting head 31 of a line head type may be used.

After the printed medium M is peeled off from the conveyance belt 22 by the winding unit 40, the conveyance belt 22 is folded-back at the driving roller 24 so as to move in the conveyance preparation path. Note that in the case where printing of a pattern or the like is performed on the medium M such as fabric in the conveyance path, ink transmitted through the medium M, ink protruded from the end portion of the medium M in the width direction X, fibers dropped off from the medium M, and the like adhere to the adhesive layer 25 of the conveyance belt 22.

As illustrated in FIG. 2, the liquid ejecting device 11 includes the washing unit 70 for washing the conveyance belt 22. The washing unit 70 removes inks, fibers and the like adhered on the adhesive layer 25 by washing the conveyance belt 22 moving in the conveyance preparation path, with washing solution. The washing unit 70 is disposed on the driving roller 24 side below the endless conveyance belt 22, and the washing unit 70 washes the support surface 22*a* including the adhesive layer 25 of the conveyance belt 22, from below.

The washing unit 70 includes a washing tank 71 that stores washing solution, a washing roller 72, immersed in washing solution, that rotatably makes contact with the conveyance belt 22, and a moving mechanism unit 73 that uses an air cylinder (to not illustrated in the drawing) for moving the washing unit 70 in the up-down direction and the like. In addition, the washing unit 70 includes a motor (not illustrated in the drawing) as a power source for driving the washing roller 72 into rotation.

The washing roller 72 is configured as a rotating brush with a length equal to or slightly larger than the length of the conveyance belt 22 in the width direction X. In addition, the washing roller 72 includes a rotation shaft (not illustrated in the drawing) extending in the width direction X. Both end portions of the rotation shaft are rotatably supported by the both walls of the washing tank 71.

The washing unit 70 is moved upward by the moving mechanism unit 73 and brought into contact with the support surface 22*a* of the conveyance belt 22 moving in the conveyance preparation path, from below. The washing unit 70 washes the support surface 22*a* including the adhesive layer 25 by rotating the washing roller 72 having the washing solution.

Heating Unit

Figure 4:
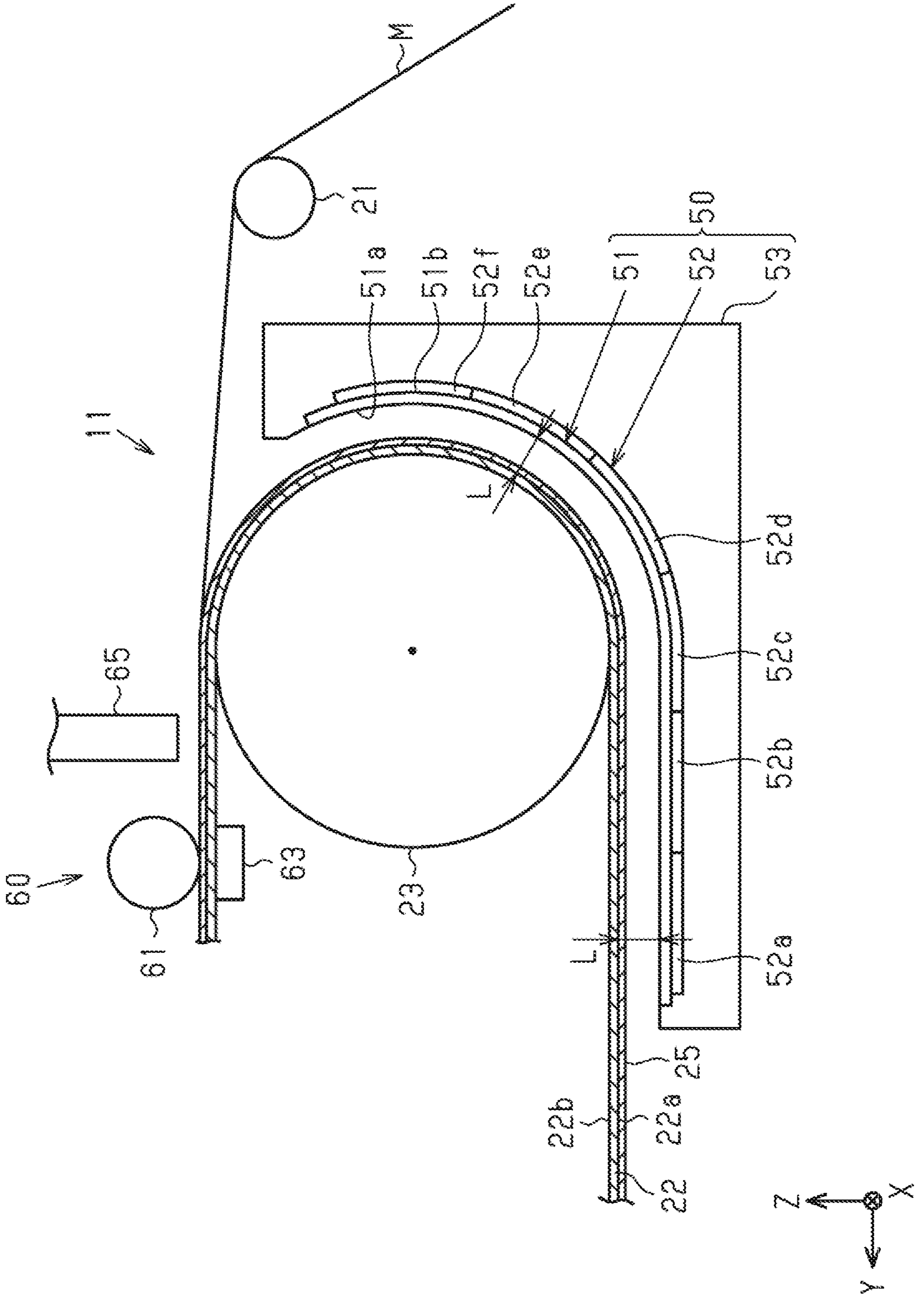
FIG. 4 is a schematic side view illustrating the heating unit of FIG. 2.

As illustrated in FIG. 4, the heating unit 50 softens the adhesive layer 25 by heating the support surface 22*a* such that the temperature of the adhesive layer 25 formed on the support surface 22*a* of the conveyance belt 22 is set to a target temperature. In this manner, the adhesive layer 25 has adhesion, and the adhesion between the medium M and the adhesive layer 25 is improved. The target temperature for the adhesive layer 25 to have adhesion is 65° C., for example. In the following description, the target temperature of the adhesive layer 25 for the adhesive layer 25 to have adhesion may be simply referred to as “target temperature”.

From the direction facing the support surface 22*a*, the heating unit 50 heats the adhesive layer 25 provided on the support surface 22*a* of the conveyance belt 22 before the medium M is supported by the support surface 22*a*. More specifically, at a position upstream of the pressing unit 60 on the conveyance preparation path, the heating unit 50 heats the support surface 22*a* including the adhesive layer 25 before the conveyance preparation path is folded-back by the rotation roller 23 at the periphery including the rotation roller 23.

The thickness of the adhesive layer 25 of this embodiment is approximately several tens of micrometers. In addition, since the thickness of the conveyance belt 22 is approximately 2 mm to 3 mm, heating the adhesive layer 25 also heats the support surface 22*a* of the conveyance belt 22. Therefore, “heating the adhesive layer 25” by the heating unit 50 may be referred to also as "heating the support surface 22*a*", or "heating the conveyance belt 22".

The heating unit 50 includes a radiation plate 51, a heating plate 52 affixed to the radiation plate 51, and a heating frame 53 that fixes the radiation plate 51 and the heating plate 52. The radiation plate 51 is installed in the state where the support surface 22*a* of the conveyance belt 22 and opposing inner surface 51*a* are separated by a distance L.

In the region before the conveyance belt 22 reaches the rotation roller 23, the support surface 22*a* and the inner surface 51*a* are separated from each other by the distance L and are approximately parallel to each other. In the region corresponding to the rotation roller 23, the radiation plate 51 is concentric with the rotation roller 23, and the support surface 22*a* and the inner surface 51*a* are separated from each other by the distance L.

The radiation plate 51 extends in the width direction X of the conveyance belt 22. The length of the radiation plate 51 in the width direction X is slightly greater at both end portions than the length of the conveyance belt 22 in the width direction X. The radiation plate 51 is formed with an aluminum plate member curved to one side.

The heating plate 52 heats the radiation plate 51 with the heating plate 52 affixed to an outer surface 51*b* of the radiation plate 51 so that the radiation plate 51 emits radiation heat to the conveyance belt 22. The heating plate 52 of this embodiment is composed of six heating plates 52. The six heating plates 52 are a first heating plate 52*a*, a second heating plate 52*b*, a third heating plate 52*c*, a fourth heating plate 52*d*, a fifth heating plate 52*e*, and a sixth heating plate 52*f* arranged in this order from the upstream side of the conveyance preparation path as the movement direction of the conveyance belt 22.

Each heating plate 52 is composed of a sheet-shaped heater of the same specification. The sheet-shaped heater is composed of a heating element such as a metal foil sandwiched inside a flexible sheet member composed of synthetic resins or the like, and thus the sheet-shaped heater generates heat such that the temperature distribution is substantially uniform. Each heating plate 52 extends in the width direction X of the conveyance belt 22. The length of the heating plate 52 in the width direction X is slightly greater at both end portions than the length of the conveyance belt 22 in the width direction X.

In this manner, each heating plate 52 is affixed over almost the entire surface of the outer surface 51*b* of the radiation plate 51. The heating frame 53 fixes the radiation plate 51 in the state where the inner surface 51*a* of the radiation plate 51 where each heating plate 52 is affixed faces the support surface 22*a* of the conveyance belt 22.

When power is supplied to the sheet-shaped heater, the heating element generates heat, and this heat is transmitted to the radiation plate 51 through the sheet member. The radiation plate 51 is warmed up when the heat from the heating plate 52 is transmitted. The warmed radiation plate 51 emits radiation heat toward the opposing support surface 22*a* of the conveyance belt 22. As a result, the adhesive layer 25 is heated.

As illustrated in FIG. 4, the liquid ejecting device 11 includes a temperature detection unit 65 that detects the temperature of the adhesive layer 25. The temperature detection unit 65 is provided upstream of the pressing unit 60 and downstream of the heating unit 50 in the conveyance direction Y of the conveyance belt 22. The medium M is pressed against the adhesive layer 25 at the pressing unit 60 located downstream of the temperature detection unit 65. Therefore, the temperature detection unit 65 is configured to be able to detect the temperature of the adhesive layer 25 immediately before the medium M makes intimate contact with the adhesive layer 25.

The heating unit 50 is controlled by the control unit 90 on the basis of the detection result of the temperature of the adhesive layer 25 at the temperature detection unit 65. For example, an infrared ray sensor is used for the temperature detection unit 65. A pair of the temperature detection units 65 are installed to face the adhesive layer 25 outside the both end portions of the medium M in the width direction X. In other words, the temperature detection units 65 are installed one at each end of the medium M in the width direction X where they do not interfere with the medium M. Thus, even when the medium M is conveyed at the support surface 22*a*, the temperature detection unit 65 can detect the temperature of the adhesive layer 25.

The temperature of each heating plate 52 is set to 200° C., for example. At this time, the temperature of the radiation plate 51 is also at substantially 200° C. The control unit 90 adjusts the power to be supplied to the heating plate 52 on the basis of the temperature detected at the temperature detection unit 65, the printing speed and the like. More specifically, through selection of the heating plate 52 to be driven and adjustment of the temperature of the selected heating plate 52 among a plurality of the heating plates 52, the control unit 90 controls the heating plate 52 such that the temperature detected at the temperature detection unit 65 is the target temperature.

When the printing speed differs, the way of warming up the conveyance belt 22 at the heating unit 50 differs. When the printing speed is high, the conveyance speed of the conveyance belt 22 is high. When the printing speed is low, the conveyance speed of the conveyance belt 22 is low. For example, when the printing speed is high, the conveyance belt 22 is warmed up only at the portion on the support surface 22*a* side. When the printing speed is low, the conveyance belt 22 is warmed up to the center portion in the thickness direction. In other words, when the printing speed is low, the time for which the conveyance belt 22 passes through the heating unit 50 is long, and accordingly the time for which the conveyance belt 22 is warmed up is long. That is, when the printing speed is low, the amount of heat accumulated in the conveyance belt 22 is large even when the electric energy for energization is lower than when the printing speed is high. Therefore, by taking into account the printing speed condition for the detection temperature of the adhesive layer 25 at the temperature detection unit 65, the heating plate 52 is controlled such that the detection temperature at the temperature detection unit 65 is the target temperature even when the printing speed is changed.

Figure 5:
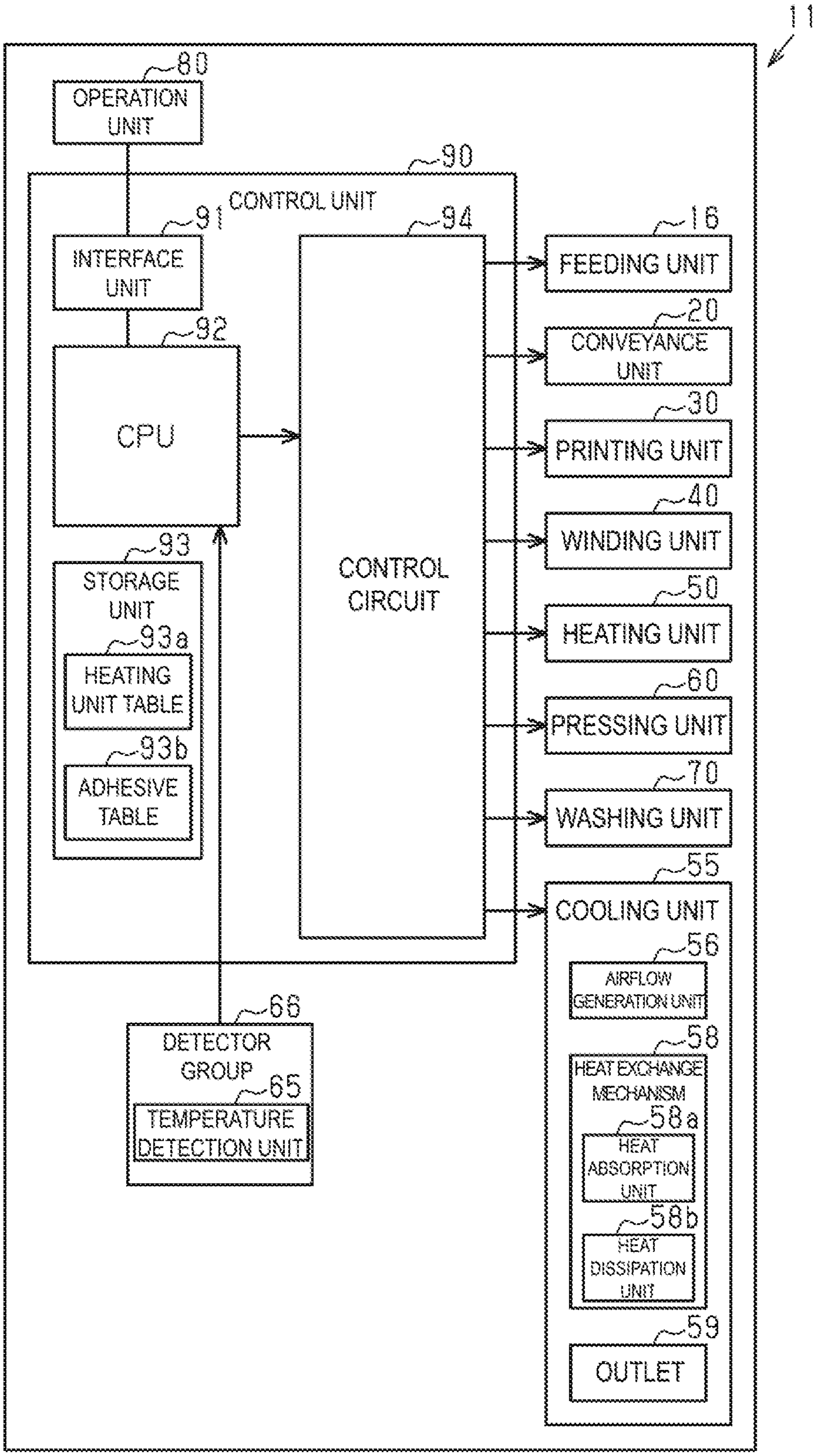
FIG. 5 is a block diagram illustrating a schematic configuration of the liquid ejecting device of FIG. 1.

As illustrated in FIG. 5, the control unit 90 controls each unit of the liquid ejecting device 11. An interface unit 91 transmits and receives data between the operation unit 80 and the control unit 90. A CPU 92 is a computation processing device for controlling the entirety of the liquid ejecting device 11. A storage unit 93 reserves a region and/or a work area for storing a program of the CPU 92. The CPU 92 controls each unit of the liquid ejecting device 11 in accordance with a control circuit 94.

The storage unit 93 stores a heating unit table 93*a* and/or an adhesive table 93*b*. Note that a detector group 66 monitors the status in the liquid ejecting device 11, and the control unit 90 controls each unit of the liquid ejecting device 11 on the basis of the detection result. Note that the above-described temperature detection unit 65 also makes up one detector group 66.

The heating unit table 93*a* that maps the printing speed and the number of the heating plates 52 to be driven corresponding to the printing speed is stored in the storage unit 93. For example, when the user selects the printing mode with the operation unit 80, the control unit 90 reads, from the heating unit table 93*a*, the number of the heating plates 52 to be driven corresponding to the printing speed in the printing mode selected by the user. After selecting the heating plate 52 to be heated, the control unit 90 drives the selected heating plate 52. Note that the heating unit table 93*a* may map the printing speed and the output of the heating plate 52 corresponding to the printing speed.

The adhesive table 93*b* that maps the type of the adhesive and the target temperature corresponding to the type of the adhesive is stored in the storage unit 93. For example, when the user selects the type of the adhesive to be used with the operation unit 80, the control unit 90 reads, from the adhesive table 93*b*, the target temperature corresponding to the adhesive. Then, the control unit 90 drives the heating plate 52 such that the temperature of the adhesive layer 25 is set to the target temperature.

Cooling Unit

As illustrated in FIG. 5, the liquid ejecting device 11 includes a cooling unit 55 that cools the conveyance belt 22 where the medium M is in intimate contact with the adhesive layer 25.

The liquid ejecting device 11 includes a heat exchange mechanism 58. The heat exchange mechanism 58 includes a heat absorption unit 58*a* that absorbs heat and a heat dissipation unit 58*b* that emits heat. The heat exchange mechanism 58 is configured to be able to exchange heat between the heat absorption unit 58*a* and the heat dissipation unit 58*b*.

More specifically, the heat exchange mechanism 58 transfers the heat absorbed by the heat absorption unit 58*a* to the heat dissipation unit 58*b*, and thus the heat is transferred. As a result, the temperature of the portion where the heat absorption unit 58*a* acts decreases, and the temperature of the portion where the heat dissipation unit 58*b* acts increases. The "heat absorption unit 58*a* acts" means that "the heat absorption unit 58*a* absorbs heat". The "heat dissipation unit 58*b* acts" means that "the heat dissipation unit 58*b* emits heat". As a result, the heat exchange mechanism 58 exchanges the heat energy between the heat absorption unit 58*a* and the heat dissipation unit 58*b*, and therefore this mechanism is referred to as heat exchange.

Figure 6:
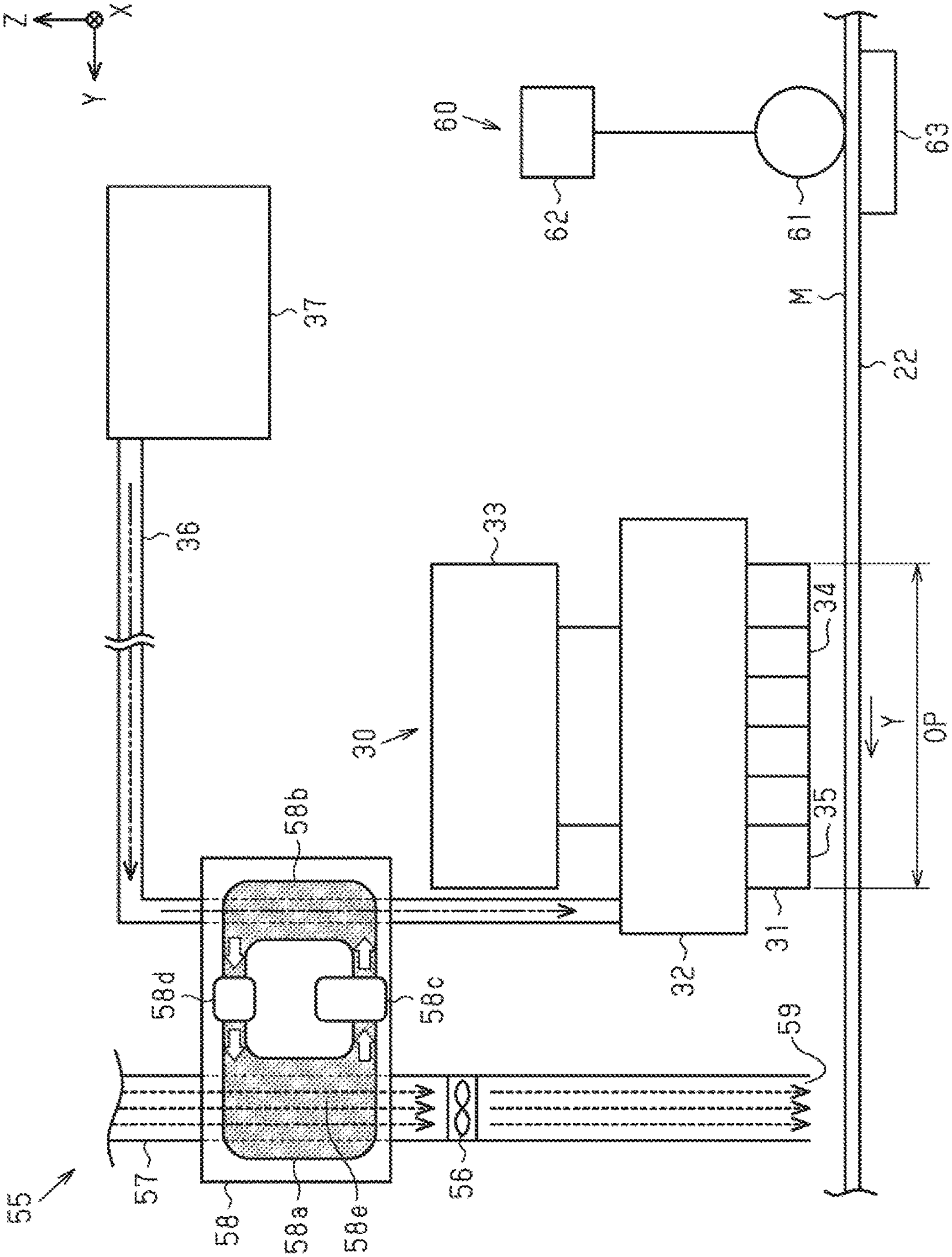
FIG. 6 is a schematic side view illustrating a cooling unit according to the first embodiment.

As illustrated in FIG. 6, a heat pump that continuously circulates fluid serving as a heat medium 58*e* is used for the heat exchange mechanism 58, for example. When the heat medium 58*e* is compressed by compressor 58*c*, the temperature of the heat medium 58*e* increases. Then, the heat medium 58*e* with the increased temperatures moves to the heat dissipation unit 58*b*, and the temperature of the liquid where the heat dissipation unit 58*b* acts is increased by the heat medium 58*e* with the increased temperatures. In this manner, the temperature of the heat medium 58*e* slightly decreases. When the heat medium 58*e* is expanded by expansion valve 58*d*, the temperature of the heat medium 58*e* further decreases. Then, the heat medium 58*e* with the lowered temperature moves to the heat absorption unit 58*a*, the temperature of the airflow where the heat absorption unit 58*a* acts is reduced by the heat medium 58*e* with the lowered temperature. In this manner, the temperature of the heat medium 58*e* slightly increases. When the heat medium 58*e* is compressed by the compressor 58*c*, the temperature of the heat medium 58*e* further increases. In this manner, in the heat pump, the heat is efficiently exchanged by continuously circulating the fluid serving as the heat medium 58*e*. That is, the heat pump transfers the heat absorbed by the heat absorption unit 58*a* to the heat dissipation unit 58*b* by continuously circulating the fluid serving as the heat medium 58*e*.

For example, a thermoelectric element such as a Peltier element may be used for the heat exchange mechanism 58. The thermoelectric element is an element that uses thermoelectric effects for conversion between electrical energy and thermal energy. When power is applied to the thermoelectric element, one surface serving as the heat absorption unit 58*a* absorbs the heat, while the other surface serving as the heat dissipation unit 58*b* emits the heat. That is, when power is applied, the thermoelectric element transfers the heat absorbed by the heat absorption unit 58*a* to the heat dissipation unit 58*b*.

The heat exchange mechanism 58 is not limited to mechanisms using heat pumps, or mechanisms using thermoelectric elements. The heat exchange mechanism 58 need only be a mechanism that transfers the heat absorbed by the heat absorption unit 58*a* to the heat dissipation unit 58*b* such that the temperature of the portion where the heat absorption unit 58*a* acts decreases while the temperature of the portion where the heat dissipation unit 58*b* acts increases. Note that in this embodiment, the heat exchange mechanism 58 is disposed in the housing 12 but is not mounted in the carriage 32.

As illustrated in FIG. 6, the liquid ejecting device 11 includes a channel member 36 that supplies liquid to the ejecting head 31. In the channel member 36, one end on the downstream side is connected with the ejecting head 31, and the other end on the upstream side is connected with a liquid tank 37 that stores the liquid to be supplied to the ejecting head 31. The liquid circulates inside the channel member 36 in the direction indicated with the chain double-dashed line arrow in FIG. 6. The channel member 36 defines the channel of the liquid supplied to the ejecting head 31. Note that the downstream side in the channel member 36 is the direction indicated with the chain double-dashed line arrow in FIG. 6. As illustrated in FIG. 1, the liquid tank 37 may be provided outside the housing 12, and the liquid tank 37 may be provided inside the housing 12 without exposing the liquid tank 37 to the outside of the housing 12. Note that in the case where inks of cyan, magenta, yellow and black are used as the liquid, the liquid tank 37 and the channel member 36 are provided for each ink color.

As illustrated in FIG. 6, the cooling unit 55 includes an airflow generation unit 56 configured to be able to generate airflow to be jetted to the conveyance belt 22 past the pressing unit 60, an airway path 57 through which that airflow circulates, and an outlet 59 configured to be able to blow that airflow to the conveyance belt 22.

The airway path 57 is a path through which gas can circulate, and includes a path composed of a member such as a tube whose interior makes up the path, a path composed of surrounding walls of a plurality of members, a path composed only of a space through which gas moves by gas flow, and the like. In the case where the path is composed of a path composed of a member such as a tube whose interior makes up the path, the member making up the path is referred to as the airway path 57. In addition, the airway path 57 is a path from an inlet (not illustrated in the drawing) where airflow blows into the airway path 57 from the outside of the liquid ejecting device 11, to the outlet 59, and includes the inlet and the outlet 59.

The airflow circulates inside the airway path 57 in the direction indicated with the broken line arrow in FIG. 6.

With the airflow generation unit 56 disposed downstream of the heat exchange mechanism 58, the airflow suctioned by the airflow generation unit 56 is ejected from the outlet 59 after passing through the heat exchange mechanism 58 and the airflow generation unit 56. Alternatively, with the airflow generation unit 56 disposed upstream of the heat exchange mechanism 58, the airflow ejected from the airflow generation unit 56 may be ejected from the outlet 59 after passing through the heat exchange mechanism 58. Alternatively, the airflow generation unit 56 may be disposed at the inlet (not illustrated in the drawing), or at the outlet 59. The airflow generation unit 56 is a fan, for example. In addition, it may be a pump that can suction or output the gas. Note that the downstream side in the airway path 57 is the direction indicated with the broken line arrow in FIG. 6.

The airway path 57 may be configured as a wide path extending over the width direction X of the conveyance belt 22, and a plurality of the airflow generation units 56 may be disposed therein in the width direction X. Then, the airflow circulating through the airway path 57 as the wide path may be ejected from a wide outlet 59 extending over the width direction X of the conveyance belt 22 after passing through the heat exchange mechanism 58. Note that the length of the airway path 57 in the width direction X is set to a length approximately equal to the length of the conveyance belt 22 in the width direction X.

A plurality of the airway paths 57 may be disposed over the width direction X of the conveyance belt 22 such that the airflow generation unit 56 is disposed at each airway path 57. Then, the airflow circulating through the airway paths 57 may be ejected from respective outlets 59 arranged in the width direction X of the conveyance belt 22 after passing through the heat exchange mechanism 58.

The airway path 57 may branch into a plurality of the airway paths 57 in the width direction X of the conveyance belt 22 after passing through the heat exchange mechanism 58 and the airflow generation unit 56. Then, in the width direction X of the conveyance belt 22, the airflow may be ejected from a plurality of the outlets 59 disposed side by side in the width direction X of the conveyance belt 22.

The heat dissipation unit **58*b* of the heat exchange mechanism 58 makes contact with the channel member 36 on the upstream side of the carriage 32. In this manner, the heat dissipation unit 58*b* acts on the channel member 36, and thus the heat dissipation unit 58*b* emits the heat to the channel member 36. Further, the heat absorption unit 58*a* of the heat exchange mechanism 58 is disposed in the course of the airway path 57 through which airflow moves. In this manner, the heat absorption unit 58*a* acts on the airway path 57, and thus the heat absorption unit 58*a* absorbs the heat from the airway path 57. As a result, the temperature of the airflow moving through the airway path 57 decreases, and the temperature of the liquid circulating in the channel member 36** increases.

Desirably, the temperature of the liquid supplied to the ejecting head 31 is a temperature that provides a viscosity suitable for the ejection from the nozzle of the ejecting head 31. Such a temperature is, for example, 35° C. to 40° C., which is higher than the temperature of the environment where the liquid ejecting device 11 is installed although the temperature differs depending on the type of the liquid to be used. When the temperature of the liquid circulating in the channel member 36 increases, supply of high viscosity liquid that tends to cause ejection defects to the ejecting head 31 can be suppressed.

The heat exchange mechanism 58 transfers the heat of the airflow moving through the airway path 57 to the liquid circulating in the channel member 36. That is, the heat exchange mechanism 58 exchanges the heat energy between the airflow moving through the airway path 57 and the liquid circulating in the channel member 36.

In the case where four inks of cyan, magenta, yellow, and black are used as the liquid, the heat dissipation unit **58*b* of the heat exchange mechanism 58 makes contact with the four channel members 36 of the four colors on the upstream side of the carriage 32**.

As illustrated in FIG. 6, a portion facing the ejecting head 31 in the conveyance belt 22 is referred to as an opposing portion OP. The movement direction of the portion facing the ejecting head 31 in the conveyance belt 22 is the same as the depth direction Y, and is therefore referred to also as a movement direction Y of the opposing portion OP. The outlet 59 is provided downstream of the pressing unit 60 in the movement direction Y of the opposing portion OP. The downstream side in the movement direction Y of the opposing portion OP is the direction indicated as the solid line arrow in FIG. 6. As illustrated in FIG. 6, the outlet 59 may be provided downstream of the ejecting head 31 in the movement direction Y of the opposing portion OP, or may be provided upstream of the ejecting head 31 in the movement direction Y of the opposing portion OP.

Operations of Embodiment

Operations of this embodiment are described below.

The support surface **22*a* includes the adhesive layer 25. The heating unit 50 heats the support surface 22*a* of the conveyance belt 22 before supporting the medium M. Thus, the temperature of the adhesive layer 25 can be increased to a temperature at which the adhesive layer 25** has adhesion.

A conveyance roller 21 relays the medium M fed from the feeding unit 16 to the conveyance belt 22. In this manner, the state of the medium M is set to a state where it is supported at the support surface **22*a* of the conveyance belt 22**.

In the state where the conveyance belt 22 including the adhesive layer 25 and the medium M are sandwiched between the press roller 61 and the roller supporting unit 63, the medium M is pressed against the adhesive layer 25 through the operation of the pressing unit 60. Thus, the medium M can make intimate contact with the support surface **22*a* with the adhesive force of the adhesive layer 25**.

The printing unit 30 performs printing on the medium M. Since the medium M is in intimate contact with the support surface **22*a*, degradation of the image quality due to float of the medium M from the support surface 22*a*** during the printing can be suppressed.

The heat exchange mechanism 58 transfers the heat absorbed by the heat absorption unit **58*a* to the heat dissipation unit 58*b*, and thus the heat is transferred. In this manner, the temperature of the portion where the heat absorption unit 58*a* acts can be reduced, and the temperature of the portion where the heat dissipation unit 58*b* acts can be increased. That is, the temperature of the airflow moving through the airway path 57 can be reduced, while reducing the temperature of the liquid circulating in the channel member 36**.

In other words, the heat exchange mechanism 58 can efficiently generate liquid with increased temperatures to be supplied to the ejecting head 31, and airflow with lowered temperatures for cooling the heated conveyance belt 22.

The channel member 36 supplies the liquid to the ejecting head 31. The channel member 36 defines the channel of the liquid supplied to the ejecting head 31. The heat dissipation unit **58*b* of the heat exchange mechanism 58 makes contact with the channel member 36 on the upstream side of the carriage 32. In this manner, the heat dissipation unit 58***b* acts on the channel member 36, and thus the heat emitted by the heat dissipation unit 58*b* can be emitted to the channel member 36.

When the heat emitted by the heat dissipation unit 58*b* is emitted to the channel member 36, the temperature of the liquid circulating in the channel member 36 increases. In this manner, the liquid with increased temperatures is supplied to the ejecting head 31, and thus supply of high viscosity liquid that tends to cause ejection defects to the ejecting head 31 can be suppressed.

The airflow circulates inside the airway path 57. The airflow ejected from the airflow generation unit 56 or the airflow suctioned by the airflow generation unit 56 is ejected from the outlet 59 after passing through the heat exchange mechanism 58. In the heat exchange mechanism 58, the heat absorption unit 58*a* acts on the channel member 36, and thus the heat absorption unit 58*a* can absorb the heat from the airway path 57.

When the heat absorption unit 58*a* absorbs the heat from the airway path 57, the temperature of the airflow moving through the airway path 57 decreases. When the temperature of the airflow moving through the airway path 57 decreases, the temperature of the airflow ejected from the outlet 59 to the conveyance belt 22 can be reduced.

The outlet 59 is located downstream of the pressing unit 60 in the movement direction Y of the conveyance belt 22. Thus, the temperature of the conveyance belt 22 after the medium M makes intimate contact with the support surface 22*a* can be reduced.

For example, in the case where the material making up the conveyance belt 22 is rubber, when the state where the conveyance belt 22 has a high temperature continues, the molecules of the rubber may break up, and reduction in physical properties and resulting cracking due to hardened or softened rubber and the like may possibly occur. Therefore, after the adhesive layer 25 is heated to a temperature at which the heating unit 50 has adhesion, it is preferable to cool the conveyance belt 22 as much as possible. For such problems, according to this embodiment, the conveyance belt 22 can be favorably cooled through the above-described operations.

Effects of Embodiment

Effects of the embodiment are described below.

The liquid ejecting device 11 of this embodiment can provide the following effects.

(1) The liquid ejecting device 11 includes the heating unit 50 configured to be able to heat the conveyance belt 22, the airflow generation unit 56 configured to be able to generate airflow to be jetted to the conveyance belt 22, and the heat exchange mechanism 58 configured to be able to exchange heat. To bring the conveyance belt 22 and the medium M before the printing into intimate contact with each other, the conveyance belt 22 is heated by the heating unit 50. When the heat exchange mechanism 58 is used, the temperature of the liquid supplied to the ejecting head 31 is increased by the heat dissipation unit 58*b* of the heat exchange mechanism 58. Then, after the airflow generated at the airflow generation unit 56 is cooled by the heat absorption unit 58*a* of the heat exchange mechanism 58, this airflow is jetted to the conveyance belt 22 in intimate contact with the medium M. By depriving the heat for heating the liquid to be supplied to the ejecting head 31 from the airflow to be jetted to the conveyance belt 22, the conveyance belt 22 can be cooled more than the case where the conveyance belt 22 is cooled with the airflow in the environment where the liquid ejecting device 11 is installed. Thus, the durability of the conveyance belt 22 can be improved.

(2) In the movement direction Y of the opposing portion OP, the outlet 59 is provided downstream of the ejecting head 31. Thus, airflow is jetted to the conveyance belt 22 after the printing has been performed on the medium M. Since the heat of the conveyance belt 22 in the region where the printing is performed on the medium M is less deprived, the adhesive force of the adhesive layer 25 in the region where the printing is performed on the medium M is less reduced. In this manner, the conveyance belt 22 can be cooled while ensuring the adhesion between the medium M and the conveyance belt 22 in the region where printing is performed on the medium M.

(3) The outlet 59 is provided upstream of the ejecting head 31 in the movement direction Y of the opposing portion OP. Thus, the airflow is jetted to the conveyance belt 22 before the printing is performed on the medium M. Since the heat of the conveyance belt 22 is deprived before the conveyance belt 22 faces the ejecting head 31, the heat of the conveyance belt 22 less affects the ejecting performance of the ejecting head 31. For example, clogging of the nozzle due to heat and the like less occur. In this manner, the conveyance belt 22 can be cooled while suppressing defects of the ejecting head 31.

Second Embodiment

A liquid ejecting device of a second embodiment that performs printing by ejecting liquid onto a medium is described below with reference to the drawings. The second embodiment is substantially the same as the first embodiment, and therefore the same components are denoted with the same reference numerals and overlapping description is omitted. The second embodiment differs from the first embodiment in configuration of the cooling unit 55.

Cooling Unit

As illustrated in FIG. 5, the liquid ejecting device 11 includes a cooling unit 55 that cools the conveyance belt 22 where the medium M is in intimate contact with the adhesive layer 25.

The liquid ejecting device 11 includes a heat exchange mechanism 58. The heat exchange mechanism 58 includes a heat absorption unit 58*a* that absorbs heat and a heat dissipation unit 58*b* that emits heat. The heat exchange mechanism 58 is configured to be able to exchange heat between the heat absorption unit 58*a* and the heat dissipation unit 58*b*.

Figure 7:
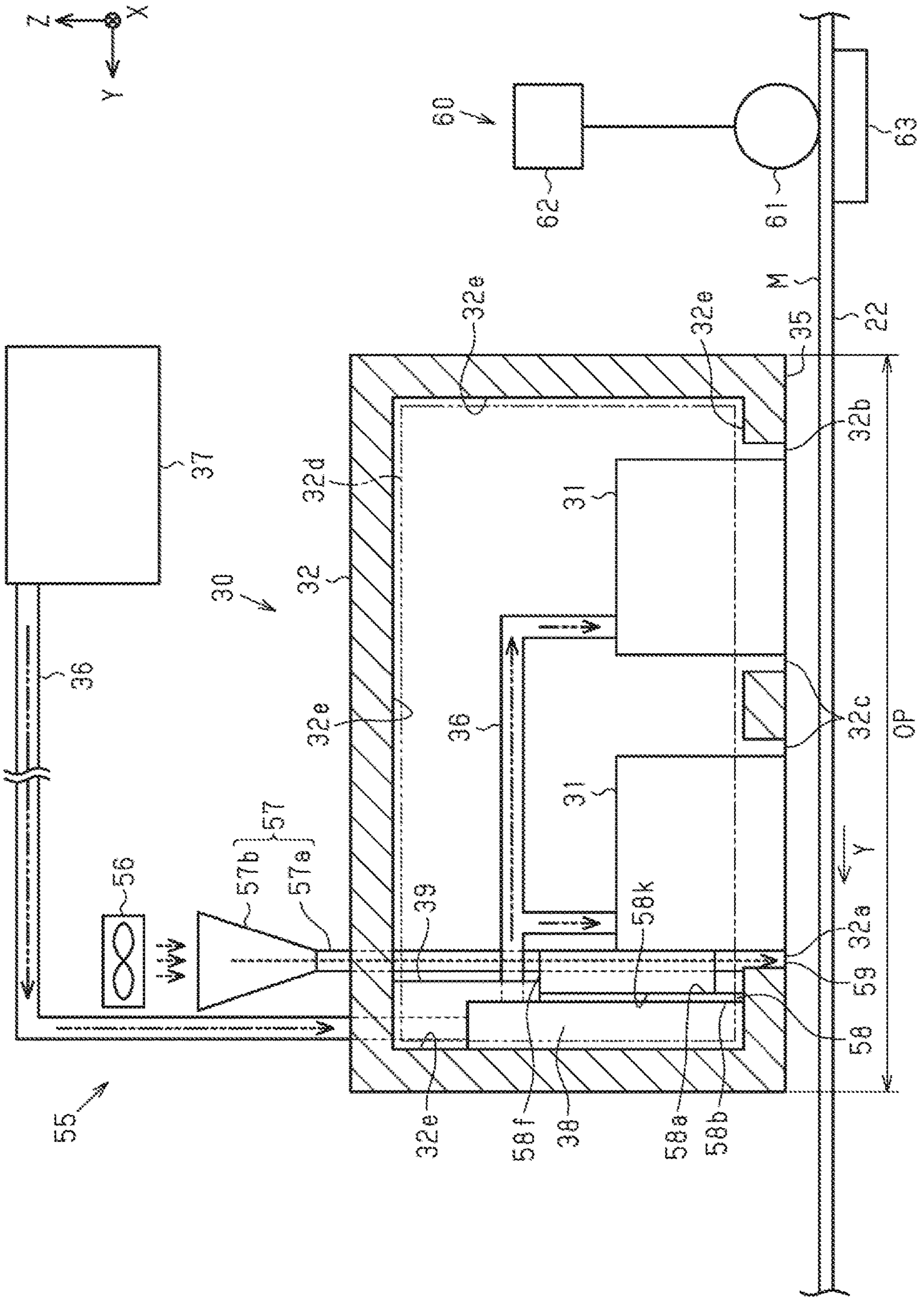
FIG. 7 is a schematic side view illustrating a cooling unit according to the second embodiment.

As illustrated in FIG. 7, a Peltier element that uses a thermoelectric effect for conversion between electrical energy and heat energy is used for the heat exchange mechanism 58, for example. When current flows through the Peltier element, the temperature of the heat dissipation unit 58*b* as one surface increases, and the temperature of the heat absorption unit 58*a* as the other surface decreases. Then, the temperature of the portion where the heat dissipation unit 58*b* acts is increased by the heat dissipation unit 58*b* with the increased temperatures, and the temperature of the portion where the heat absorption unit 58*a* acts is reduced by the heat absorption unit 58*a* with the lowered temperatures.

A heat pump that continuously circulates the fluid serving as the heat medium 58*e* may be used for the heat exchange mechanism 58, for example. The heat exchange mechanism 58 is not limited to mechanisms using heat pumps, or mechanisms using thermoelectric elements. The heat exchange mechanism 58 need only be a mechanism that reduces the temperature of the portion where the heat absorption unit 58*a* acts, and increases the temperature of the portion where the heat dissipation unit 58*b* acts.

In this embodiment, the heat exchange mechanism 58 is mounted in the carriage 32. Further, the carriage 32 includes a housing unit 32*d* having an internal space that houses the ejecting head 31 and the heat exchange mechanism 58. In this embodiment, the internal space that houses the ejecting head 31 and the heat exchange mechanism 58 is a closed internal space. The closed internal space is a space surrounded by a wall 32*e* in the housing unit 32*d*. The housing unit 32*d* has the closed internal space, but its internal space is not a sealed space. Specifically, the housing unit 32*d* includes one or a plurality of connection units that connect the inside of the housing unit 32*d* and the outside of the housing unit 32*d*. The airway path 57 and the channel member 36 described later are examples of the connection unit that connects the inside of the housing unit 32*d* and the outside of the housing unit 32*d*. In addition, gaps 32*a*, 32*b* and 32*c* between the carriage 32 and the ejecting head 31 are examples of the connection unit that connects the inside of the housing unit 32*d* and the outside of the housing unit 32*d*.

As illustrated in FIG. 7, the liquid ejecting device 11 includes the channel member 36 that supplies liquid to the ejecting head 31. In the channel member 36, one end on the downstream side is connected with the ejecting head 31, and the other end on the upstream side is connected with the liquid tank 37 that stores the liquid to be supplied to the ejecting head 31. The channel member 36 is connected with the ejecting head 31 through the inside of the housing unit 32*d*.

The channel member 36 includes a sub tank 38 inside the carriage 32 in the course of the channel member 36. In other words, the liquid supplied from the liquid tank 37 is supplied to the ejecting head 31 through the inside of the sub tank 38. The sub tank 38 makes contact with the heat dissipation unit 58*b*. Specifically, when the heat dissipation unit 58*b* acts on the liquid inside the sub tank 38, the temperature of the liquid inside the sub tank 38 increases. Then, the liquid with increased temperatures is supplied to the ejecting head 31.

The liquid ejecting device 11 may include a plurality of the ejecting heads 31 inside the housing unit 32*d*. Further, the channel member 36 passing through the inside of the housing unit 32*d* may be branched into a plurality of the channel members 36 on the downstream side of the sub tank 38 such that the downstream end portions of the plurality of channel members 36 are connected with the respective ejecting heads 31.

Liquid circulates inside the channel member 36 in the direction indicated with the chain double-dashed line arrow in FIG. 7. The channel member 36 defines the channel of the liquid supplied to the ejecting head 31. Note that the downstream side in the channel member 36 is the direction indicated with the chain double-dashed line arrow in FIG. 7. As illustrated in FIG. 1, the liquid tank 37 may be provided outside the housing 12, and the liquid tank 37 may be provided inside the housing 12 without exposing the liquid tank 37 to the outside of the housing 12.

The liquid tank 37 may be mounted inside the carriage 32. In this case, the sub tank 38 may be omitted. More specifically, the channel member 36 may be provided inside the carriage 32 such that one end of the channel member 36 on the downstream side is connected with the ejecting head 31 and that the other end on the upstream side is connected with the liquid tank 37 that stores the liquid to be supplied to the ejecting head 31. In other words, the portion of the channel member 36 inserted from the outside of the carriage 32 may not be provided and the liquid tank 37 may be located at the location of the sub tank 38 illustrated in FIG. 7. In this manner, the liquid tank 37 makes contact with the heat dissipation unit 58*b*. That is, when the heat dissipation unit 58*b* acts on the liquid inside the liquid tank 37, the temperature of the liquid inside the liquid tank 37 increases. Then, the liquid with increased temperatures is supplied to the ejecting head 31.

As illustrated in FIG. 7, the cooling unit 55 includes the airflow generation unit 56 configured to be able to generate airflow to be jetted to the conveyance belt 22 past the pressing unit 60, and the airway path 57 through which the airflow circulates. The airway path 57 is configured such that the airflow from the airflow generation unit 56 is sent into the housing unit 32*d*. The airway path 57 includes an airway member 57*a* with a tubular shape, and an inflow member 57*b* for entering the airflow ejected by the airflow generation unit 56 into the airway member 57*a*, for example. The airway member 57*a* connects the outside of the housing unit 32*d* and the inside of the housing unit 32*d*. Thus, the airflow entered by the airflow generation unit 56 into the airway member 57*a* on the outside of the housing unit 32*d* is sent into the housing unit 32*d*.

In the housing unit 32*d*, the cooling unit 55 includes the outlet 59 configured to be able to blow, to the conveyance belt 22, the airflow circulating in the airway path 57. In other words, the housing unit 32*d* includes the outlet 59 configured to be able to blow, to the conveyance belt 22, the airflow sent into the housing unit 32*d*.

The airflow circulates inside the airway path 57 in the direction indicated with the broken line arrow in FIG. 7. The heat exchange mechanism 58 is disposed downstream of the airflow generation unit 56, and thus the airflow ejected from the airflow generation unit 56 is ejected from the outlet 59 after passing through the heat exchange mechanism 58. The airflow generation unit 56 is a fan, for example. Note that the downstream side in the airway path 57 is the direction indicated with the broken line arrow in FIG. 7. The airway member 57*a* defines the path through which the airflow moves in the housing unit 32*d*. The airway member 57*a* passes through the portion where the heat absorption unit 58*a* acts in the course of the airway path 57 through which airflow moves. Specifically, when the heat absorption unit 58*a* acts on the airway member 57*a*, the temperature of the airflow inside the airway member 57*a* decreases. Then, the airflow with lowered temperatures is jetted to the conveyance belt 22.

The airflow generation unit 56 may be mounted in the carriage 32, or may be provided in the housing 12 without being mounted in the carriage 32. In the case where the airflow generation unit 56 is provided in the housing 12, the airway member 57*a* moves back and forth together with the back and forth movement of the carriage 32. As such, the airway member 57*a* is composed of a repeatably bendable material and a repeatably bendable path to withstand the repetitive back and forth movement.

One or a plurality of the outlets 59 may be provided. Since the carriage 32 moves along the width direction X, the position of the outlet 59 moves along the width direction X together with the carriage 32. Thus, even in the case where only one outlet 59 is provided, the airflow can be jetted to the conveyance belt 22 over the width direction X of the conveyance belt 22. That is, even in the case where only one outlet 59 is provided, the airflow can be jetted to the entirety of the conveyance belt 22.

The heat dissipation unit 58_b_ of the heat exchange mechanism 58 makes up the channel member 36 inside the carriage 32. In this manner, the heat dissipation unit 58_b_ acts on the channel member 36, and thus the heat dissipation unit 58_b_ emits the heat to the channel member 36. Further, the heat absorption unit 58_a_ of the heat exchange mechanism 58 is disposed inside the carriage 32 in the course of the airway path 57 through which airflow moves. In this manner, the heat absorption unit 58_a_ acts on the airway path 57, and thus the heat absorption unit 58_a_ absorbs the heat from the airway path 57. As a result, the temperature of the airflow moving through the airway path 57 decreases, and the temperature of the liquid circulating in the channel member 36 increases. In this embodiment, the heat dissipation unit 58_b_ of the heat exchange mechanism 58 makes contact with the surface of the sub tank 38 inside the carriage 32.

The surface of the sub tank 38 may be covered with a heat insulation material 39 so that the heat is not emitted from the surface of the sub tank 38. In the case where the material used for the carriage 32 is a heat insulating material, the sub tank 38 may be installed in the state where the surface of the sub tank 38 is in intimate contact with the inner surface of the carriage 32 as in this embodiment. The heat insulation material 39 may be provided only in the portion where the surface of the sub tank 38 is exposed. It is possible to suppress the drop of the temperature of the liquid inside the sub tank 38 with the temperature increased with the heat dissipation unit 58_b_.

Desirably, the heat dissipation unit 58_b_ and the sub tank 38 are disposed away from the ejecting head 31 for the purpose of reducing the influence of the heat on the ejecting head 31. Therefore, the heat absorption unit 58_a_ is disposed between the heat dissipation unit 58_b_ and the ejecting head 31. That is, the heat absorption unit 58_a_ is located between the heat dissipation unit 58_b_ and the ejecting head 31.

As illustrated in FIG. 7, the outlet 59 is provided downstream of the pressing unit 60 in the movement direction Y of the opposing portion OP. As illustrated in FIG. 7, the outlet 59 may be provided downstream of the ejecting head 31 in the movement direction Y of the opposing portion OP, or may be provided upstream of the ejecting head 31 in the movement direction Y of the opposing portion OP.

In the case where the outlet 59 is provided downstream of the ejecting head 31 in the movement direction Y of the opposing portion OP, the gap 32_a_ serves as the outlet 59, for example. In this case, the downstream end of the airway member 57_a_ is connected to the gap 32_a_, or the airflow is jetted to the gap 32_a_ from the downstream end of the airway member 57_a_, and thus, the gap 32_a_ serves as the outlet 59.

In the case where the outlet 59 is provided upstream of the ejecting head 31 in the movement direction Y of the opposing portion OP, the gap 32_b_ serves as the outlet 59, for example. In this case, the downstream end of the airway member 57_a_ is connected to the gap 32_b_, or the airflow is jetted to the gap 32_b_ from the downstream end of the airway member 57_a_, and thus, the gap 32_b_ serves as the outlet 59. For example, the airway member 57_a_ may change the direction after passing through the heat absorption unit 58_a_ such that the downstream end of the airway member 57_a_ is connected to the gap 32_b_.

The heat exchange mechanism 58 and the sub tank 38 may be provided in the state where the surface of the sub tank 38 is in intimate contact with the wall 32_e_ inside the housing unit 32_d_ on the upstream side in the carriage 32 in the movement direction Y of the opposing portion OP. Even after the airway member 57_a_ passes through the portion of a heat absorption fin 58_f_, the airway member 57_a_ may extend straight. That is, also in the case where the outlet 59 is provided upstream of the ejecting head 31 in the movement direction Y of the opposing portion OP, the flow direction of the airflow in the airway path 57 may be straight.

Heat Absorption Fin

Figure 8:
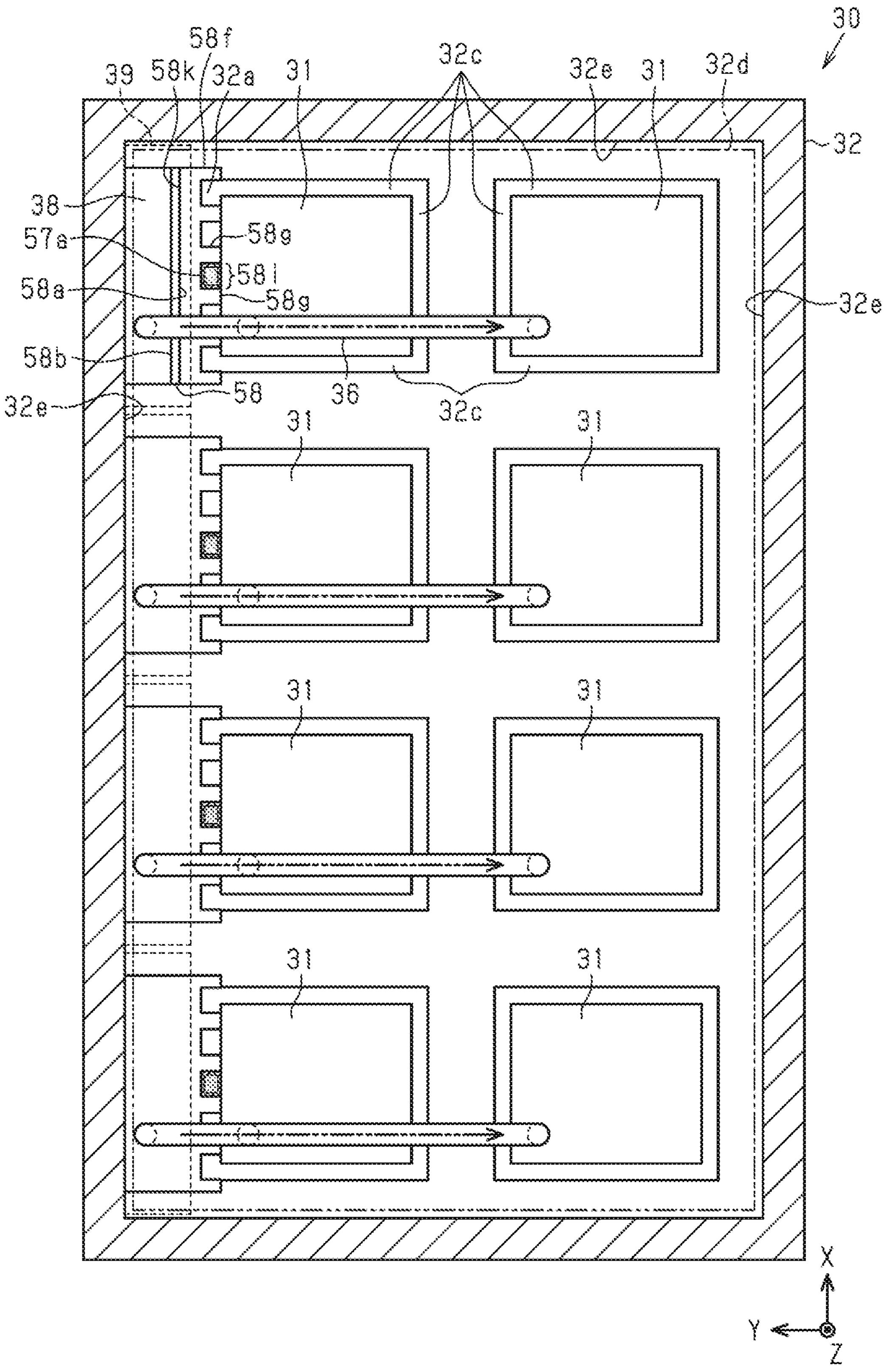
FIG. 8 is a schematic plan view illustrating a housing unit according to the second embodiment.

As illustrated in FIG. 8, the liquid ejecting device 11 includes the heat absorption fin 58_f_ housed inside the housing unit 32_d_ and including a plurality of protrusions 58_g_. The fin is a structure formed with the plurality of protrusions 58_g_ so as to have a large surface area for the purpose of increasing the heat transfer efficiency from the surface. The heat absorption fin 58_f_ is a heat absorption member with such a structure. In the heat absorption fin 58_f_ of this embodiment, the protrusions 58_g_ extending in the gravity direction Z are disposed side by side at substantially even intervals in the width direction X. Aluminum, copper and the like with high heat transfer efficiency are used for the material of the heat absorption fin 58_f_.

The heat absorption fin 58_f_ is connected to the heat absorption unit 58_a_ of the heat exchange mechanism 58. More specifically, the heat absorption fin 58_f_ absorbs heat from the surface of the protrusion 58_g_, and further, the heat absorption unit 58_a_ connected in a surface contact manner to a connection surface 58_k_ of the heat absorption fin 58_f_ absorbs that heat from the connection surface 58_k_. In other words, when the heat absorption fin 58_f_ is interposed, the portion where the heat absorption unit 58_a_ acts is the space in the vicinity of the surface of the protrusion 58_g_ and the surface of the protrusion 58_g_.

In the housing unit 32_d_, the airway member 57_a_ defines the path through which the airflow moves such that the airflow passes through the vicinity of the surface of the protrusion 58_g_, and thus the heat is absorbed from the airflow. More specifically, the airway member 57_a_ causes the airflow inside the airway member 57_a_ to pass through at least one space 58_i_ of spaces 58_i_ between the protrusions 58_g_ adjacent to one another.

To absorb a lot of heat at the surface of the protrusion 58_g_, it is desirable that the surface of the protrusion 58_g_ and the airway member 57_a_ through which airflow passes be in contact with each other in a large area. In this embodiment, the airway member 57_a_ passes through the space 58_i_ of two protrusions 58_g_ adjacent to each other of the heat absorption fin 58_f_ while while making contact with both the two protrusions 58_g_.

The airway member 57_a_ is a flexible resin tube, for example. Desirably, the diameter of the tube is slightly greater than the distance between two protrusions 58_g_ adjacent to each other. In the case where the diameter of the tube is slightly greater than the distance between two protrusions 58_g_ adjacent to each other, the outer surface of the tube is crushed by the surfaces of the two protrusions 58_g_, and as a result the tube deforms in a substantially rectangular shape along the surfaces of the two protrusions 58_g_ and passes between the space 58_i_ of the two protrusions 58_g_. Further, the outer surface of the tube also makes contact with the surface connecting the surfaces of the two protrusions 58_g_ at the space 581 of the two protrusions 58_g_. In this manner, the surface area where the outer surface of the tube makes contact with the heat absorption fin 58_f_ is large, and thus the heat absorption amount increases. In the case where the diameter of the tube is considerably larger than the distance between two protrusions 58_g_ adjacent to each other, the tube is crushed and deformed in a direction of protruding from the space 58_i_ of the protrusions 58_g_, and as a result the amount of the airflow passing through the space 58_i_ of the two protrusions 58_g_ is small. As a result, the heat absorption amount is small. In the case where the diameter of the tube is smaller than the distance between two protrusions 58*g* adjacent to each other, the tube and the protrusions 58*g* make contact with each other only occasionally, and as a result the contact area between the tube and the heat absorption fin 58*f* is small. As a result, the heat absorption amount is small.

To absorb a lot of heat from the heat absorption fin 58*f* at the heat absorption unit 58*a*, it is desirable that the heat absorption unit 58*a* and the heat absorption fin 58*f* be in contact with each other in a large area. In this embodiment, the heat absorption fin 58*f* is provided with the connection surface 58*k* as a flat surface at the surface on the side opposite to the surface where the plurality of protrusions 58*g* are provided. The connection surface 58*k* as a flat surface and the heat absorption unit 58*a* as one surface of the Peltier element serving as the heat exchange mechanism 58 make intimate contact with each other, and thus the heat absorption unit 58*a* and the heat absorption fin 58*f* make contact with each other in a large area.

In the case where four inks of cyan, magenta, yellow, and black are used as the liquid, a plurality of Peltier elements may be used as the heat exchange mechanism 58. As illustrated in FIG. 8, the liquid ejecting device 11 of this embodiment includes the ejecting head 31 that can eject cyan ink, the ejecting head 31 that can eject magenta ink, the ejecting head 31 that can eject yellow ink, and the ejecting head 31 that can eject black ink.

The ejecting heads 31 of respective colors are disposed side by side in the width direction X. Further, the sub tank 38 for cyan ink, the sub tank 38 for magenta ink, the sub tank 38 for yellow ink, and the sub tank 38 for black ink are disposed for respective ejecting heads 31. When the heat dissipation units 58*b* of the Peltier elements act on the sub tanks 38 of respective colors, the temperatures of the liquid inside the sub tanks 38 of respective colors increase. Then, the liquids with increased temperatures are supplied to respective ejecting heads 31.

In this embodiment, the airway member 57*a* is branched into four parts. The heat absorption units 58*a* of the Peltier elements act on the airflow passing through the branched airway members 57*a*, and thus the temperature of the airflow decreases. Then, the airflow with lowered temperatures is jetted to the conveyance belt 22 from each outlet 59.

Operations of Embodiment

Operations of this embodiment are described below.

The support surface 22*a* includes the adhesive layer 25. The heating unit 50 heats the support surface 22*a* of the conveyance belt 22 before supporting the medium M. Thus, the temperature of the adhesive layer 25 can be increased to a temperature at which the adhesive layer 25 has adhesion.

A conveyance roller 21 relays the medium M fed from the feeding unit 16 to the conveyance belt 22. In this manner, the state of the medium M is set to a state where it is supported at the support surface 22*a* of the conveyance belt 22.

In the state where the conveyance belt 22 including the adhesive layer 25 and the medium M are sandwiched between the press roller 61 and the roller supporting unit 63, the medium M is pressed against the adhesive layer 25. Thus, the medium M can make intimate contact with the support surface 22*a* with the adhesive force of the adhesive layer 25.

The printing unit 30 performs printing on the medium M. Since the medium M is in intimate contact with the support surface 22*a*, degradation of the image quality due to float of the medium M from the support surface 22*a* during the printing can be suppressed.

The heat exchange mechanism 58 transfers the heat absorbed by the heat absorption unit 58*a* to the heat dissipation unit 58*b*, and thus the heat is transferred. In this manner, the temperature of the portion where the heat absorption unit 58*a* acts can be reduced, and the temperature of the portion where the heat dissipation unit 58*b* acts can be increased. That is, the temperature of the airflow moving through the airway path 57 can be reduced, while reducing the temperature of the liquid circulating in the channel member 36.

In other words, the heat exchange mechanism 58 can efficiently generate liquid with increased temperatures to be supplied to the ejecting head 31, and airflow with lowered temperatures for cooling the heated conveyance belt 22.

The channel member 36 supplies the liquid to the ejecting head 31. The channel member 36 defines the channel of the liquid supplied to the ejecting head 31. The heat dissipation unit 58*b* of the heat exchange mechanism 58 makes contact with the channel member 36 on the upstream side of the carriage 32. In this manner, the heat dissipation unit 58*b* acts on the channel member 36, and thus the heat emitted by the heat dissipation unit 58*b* can be emitted to the channel member 36.

When the heat emitted by the heat dissipation unit 58*b* is emitted to the channel member 36, the temperature of the liquid circulating in the channel member 36 increases. In this manner, the liquid with increased temperatures is supplied to the ejecting head 31, and thus supply of high viscosity liquid that tends to cause ejection defects to the ejecting head 31 can be suppressed.

The airflow circulates inside the airway path 57. The airflow ejected from the airflow generation unit 56 or the airflow suctioned by the airflow generation unit 56 is ejected from the outlet 59 after passing through the heat exchange mechanism 58. In the heat exchange mechanism 58, the heat absorption unit 58*a* acts on the channel member 36, and thus the heat absorption unit 58*a* can absorb the heat from the airway path 57.

The space 58*i* between the protrusions 58*g* adjacent to one another includes three surfaces, namely, the surface of the one protrusion 58*g*, the surface of the other protrusion 58*g*, and the surface connecting the surfaces of the two protrusions 58*g* at the space 58*i* of the two protrusions 58*g*. The airway member 57*a* causes the airflow to pass through the space 58*i* between the protrusions 58*g* adjacent to one another, and thus the area for absorbing the heat of the airflow can be increased.

When the heat absorption unit 58*a* absorbs the heat from the airway path 57, the temperature of the airflow moving through the airway path 57 decreases. When the temperature of the airflow moving through the airway path 57 decreases, the temperature of the airflow ejected from the outlet 59 to the conveyance belt 22 can be reduced.

The outlet 59 is located downstream of the pressing unit 60 in the movement direction Y of the conveyance belt 22. Thus, the temperature of the conveyance belt 22 after the medium M makes intimate contact with the support surface 22*a* can be reduced.

The heat is exchanged in the closed internal space of the housing unit 32*d*, which is a portion surrounded by the wall 32*e*. In this manner, the heat transfer is limited to the range inside the housing unit 32*d*. In this manner, heat transfer between the heat absorption unit 58*a* and portions other than the airway path 57 and heat transfer between the heat dissipation unit 58*b* and portions other than the channel member 36 can be suppressed. In this manner, the heat can be more efficiently exchanged.

Desirably, the material of the housing unit 32*d* in the carriage 32 is a heat insulating material. This can suppress heat transfer between the outside of the housing unit 32*d* and the member inside the housing unit 32*d*. In this manner, in the closed internal space of the housing unit 32*d*, the heat can be more efficiently exchanged.

Effects of Embodiment

Effects of the embodiment are described below.

The liquid ejecting device 11 of this embodiment can achieve the same effects as (1), (2) and (3) of the first embodiment.

(4) The housing unit 32*d* including the closed internal space that houses the ejecting head 31 and the heat exchange mechanism 58 is provided, and the channel member 36 is connected with the ejecting head 31 through the inside of the housing unit 32*d*. The airway path 57 is configured such that the airflow from the airflow generation unit 56 is sent into the housing unit 32*d*. The housing unit 32*d* includes the outlet 59 configured to be able to blow, to the conveyance belt 22, the airflow sent into the housing unit 32*d*. The heat is exchanged between the heat absorption unit 58*a* that absorbs heat from the liquid to be supplied to the ejecting head 31 and the heat dissipation unit 58*b* that emits heat to the airflow to be blown to the conveyance belt 22 in the closed internal space in the housing unit 32*d*. In this manner, the heat is more efficiently exchanged. The airflow from which the heat has been efficiently emitted is blown out to the conveyance belt 22, and thus the effect of cooling the conveyance belt 22 can be further improved.

(5) The heat absorption fin 58*f* that is housed inside the housing unit 32*d* and includes the plurality of protrusions 58*g* is provided. The heat absorption fin 58*f* is connected to the heat absorption unit 58*a*. With the plurality of protrusions 58*g* of the heat absorption fin 58*f*, the surface area of the portion where the heat absorption unit 58*a* absorbs heat increases than the case where the heat absorption unit 58*a* is a flat surface, and thus the effect of cooling the conveyance belt 22 can be improved.

(6) The airway path 57 includes the airway member 57*a* that defines the path through which the airflow moves in the housing unit 32*d*. The airway member 57*a* causes the airflow to pass through at least one space 58*i* of the spaces 58*i* between the protrusions 58*g* adjacent to one another. The space 58*i* between the protrusions 58*g* adjacent to one another includes three surfaces, namely, the surface of the one protrusion 58*g*, the surface of the other protrusion 58*g*, and the surface connecting the surfaces of the two protrusions 58*g* at the space 58*i* of the two protrusions 58*g*. The airway member 57*a* causes the airflow to pass through the space 58*i* between the protrusions 58*g* adjacent to one another, and thus the heat absorption unit 58*a* absorbs the heat of the airflow from the three surfaces. In this manner, the surface area of the portion where the heat absorption unit 58*a* absorbs heat increases, and thus the effect of cooling the conveyance belt 22 can be improved.

(7) With the heat absorption unit 58*a* located between the heat dissipation unit 58*b* and the ejecting head 31, the heat dissipation unit 58*b* that emits heat is disposed at a position separated from the ejecting head 31. For example, with the heat emitted from the heat dissipation unit 58*b*, the temperature of the nozzle portion of the ejecting head 31 is increased to a temperature equal to or greater than the temperature of the supplied liquid. If the temperature of the liquid portion that makes contact with the surface of the nozzle is increased to a temperature equal to or greater than the temperature suitable for ejection, clogging of the nozzle tends occur. That is, with the heat absorption unit 58*a* located between the heat dissipation unit 58*b* and the ejecting head 31, the influence of the heat on the ejecting head 31 can be suppressed.

Modifications of Embodiments

The embodiments may be modified as follows. The embodiments and the following modifications may be combined insofar as they are not technically inconsistent.

Figure 9:
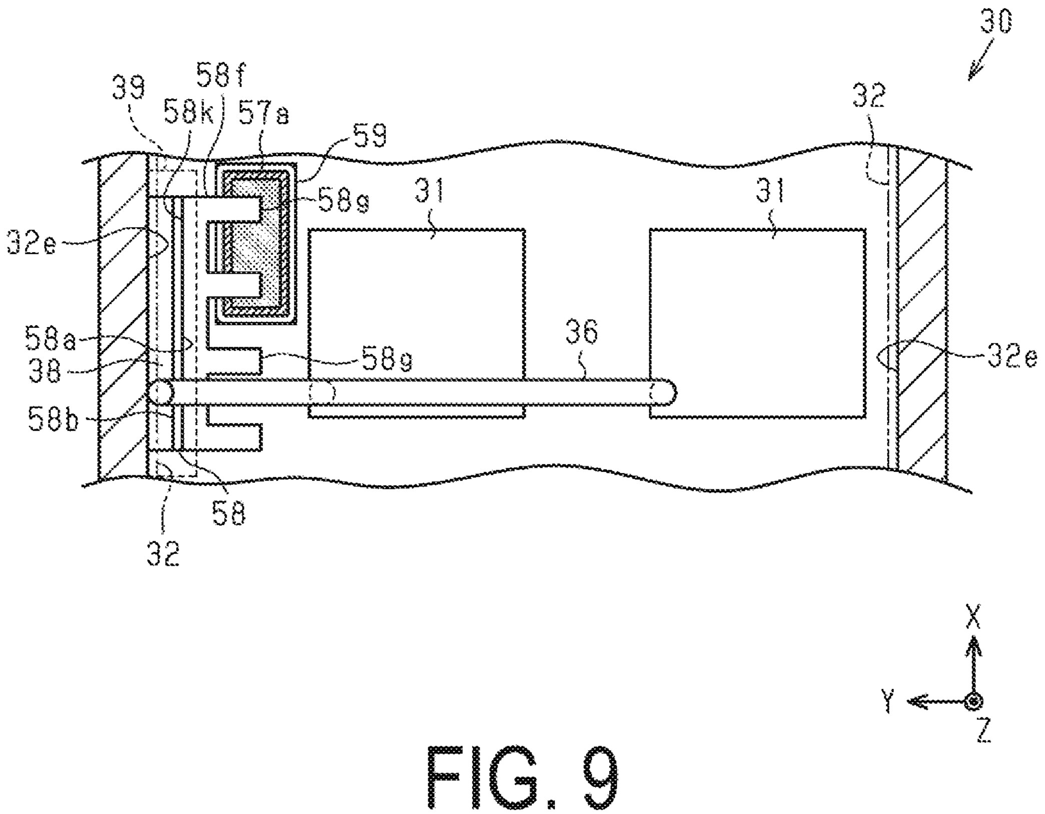
FIG. 9 is a schematic plan view illustrating a housing unit according to a first modification of the second embodiment.

In the second embodiment, as illustrated in FIG. 9, the surface of the protrusion 58*g* and the airflow passing through the airway member 57*a* may make direct contact with each other. In a part of its outer surface, the airway member 57*a* includes at least one hole to which the protrusion 58*g* can be inserted, and when the protrusion 58*g* is inserted to the hole, the surfaces of the protrusions 58*g* inserted to respective holes make direct contact with the airflow passing through the airway member 57*a*. Since the surface of the protrusion 58*g* of the heat absorption fin 58*f* makes direct contact with the airflow, the cooling efficiency of the airflow can be increased. That is, the airway member 57*a* causes the airflow inside the airway member 57*a* to pass through at least one space 58*i* of the spaces 58*i* between the protrusions 58*g* adjacent to one another. Note that it is desirable to seal the gap between the surface of the protrusion 58*g* and the hole so that the airflow does not leak from the gap. As the sealing member, a rubber member, an adhesive agent and the like are used, for example.

Figure 10:
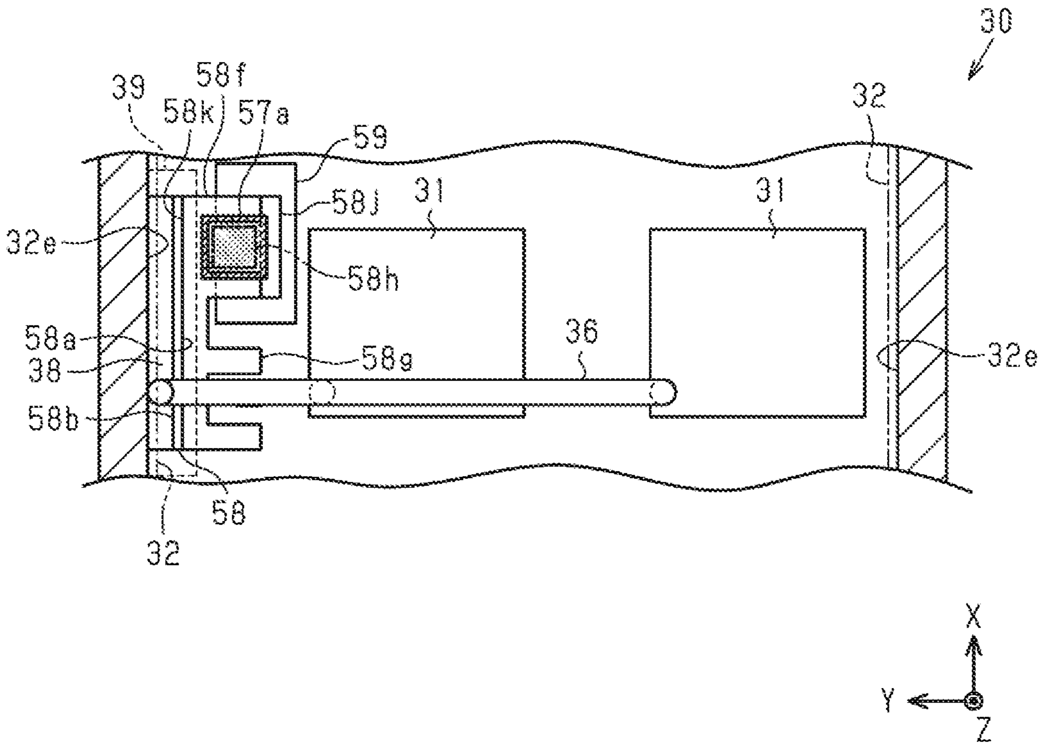
FIG. 10 is a schematic plan view illustrating a housing unit according to a second modification of the second embodiment.

In the second embodiment, as illustrated in FIG. 10, at least a part of the heat absorption fin 58*f* may be configured as a tubular portion 58*h* with a tubular shape. Further, the airflow may pass through the tubular portion 58*h*. For example, the heat absorption fin 58*f* includes a lid member 58*j* on the side of the surface where the plurality of protrusions 58*g* are disposed side by side. The lid member 58*j* is joined to the heat absorption fin 58*f* in the state where it is in contact with the ends of at least two protrusions 58*g*. In this manner, in the heat absorption fin 58*f*, at least one tubular portion 58*h* is configured. When the airway member 57*a* is connected to the tubular portion 58*h*, the airway member 57*a* and the tubular portion 58*h* are connected to each other. Then, the airflow passing through the airway member 57*a* passes through the tubular portion 58*h*. Two or more tubular portions 58*h* may be configured in the heat absorption fin 58*f*, and the airway member 57*a* may be connected to the two or more tubular portions 58*h* such that the airflow passes through two or more tubular portions 58*h*. The outlet 59 is disposed at a position where the airflow past the tubular portion 58*h* is blown out from the outlet 59. When the airflow passes through the tubular portion 58*h*, the surface of the protrusion 58*g* of the heat absorption fin 58*f* makes direct contact with the airflow, and thus the cooling efficiency of the airflow can be increased. That is, the airway member 57*a* causes the airflow inside the airway member 57*a* to pass through at least one space 58*i* of the spaces 58*i* between the protrusions 58*g* adjacent to one another. Note that it is preferable that the material of the lid member 58*j* be the same as that of the heat absorption fin 58*f*. The airflow passing through the tubular portion 58*h* also make contact with the surface of the lid member 58*j*, and thus the cooling efficiency of the airflow can be increased.

In the second embodiment, the position of the outlet 59 may be changed as necessary. Since the carriage 32 moves along the width direction X, the position of the outlet 59 moves along the width direction X together with the carriage 32. In this manner, regardless of the position of the outlet 59, the airflow can be jetted to the conveyance belt 22 over the width direction X of the conveyance belt 22. That is, regardless of the position of the outlet 59, the airflow can be jetted to the entirety of the conveyance belt 22. In addition, the connection position of the channel member 36 and the sub tank 38, the path of the channel member 36, and the connection position of the channel member 36 and the ejecting head 31 may be changed as necessary in accordance with the position of the outlet 59.

In the second embodiment, the airway member 57*a* may not have the portion provided in the space 58*i* between the protrusion 58*g* and the protrusion 58*g* inside the housing unit 32*d*. For example, the location where the airflow from the airflow generation unit 56 is sent into the housing unit 32*d* may be the terminal end of the airway member 57*a*. In other words, the airway member 57*a* may not be provided inside the housing unit 32*d*. Noted that it is desirable that the position of the terminal end of the airway member 57*a* where the airflow from the airflow generation unit 56 is sent into the housing unit 32*d* be close to the heat absorption unit 58*a*. In the case where the position of the terminal end of the airway member 57*a* is close to the heat absorption unit 58*a*, the airflow easily passes through the space 58*i* between the protrusions 58*g* of the heat absorption fin 58*f* in the heat absorption unit 58*a*. When the airflow sent into the housing unit 32*d* makes contact with the surface of the protrusion 58*g* exposed to the inside of the housing unit 32*d*, the temperature of the airflow decreases. Then, the airflow with lowered temperatures is blown out from one or a plurality of the outlets 59.

In the second embodiment, the channel member 36 may make contact with the heat dissipation unit 58*b* at a portion other than the sub tank 38. Further, the liquid ejecting device 11 may include a heat dissipation fin that is housed inside the housing unit 32*d* and includes the plurality of protrusions 58*g*. Further, the heat dissipation fin may be connected to the heat dissipation unit 58*b*. Further, with the channel member 36, the liquid supplied to the ejecting head 31 may pass through at least one space 58*i* of the spaces 58*i* between the protrusions 58*g* adjacent to one another.

In the second embodiment, a heat insulating material may be used for the carriage 32, and the sub tank 38 may be embedded in the carriage 32. It is thus possible to suppress the decrease of the temperature of the liquid supplied to the ejecting head 31.

The airway member 57*a* passes through "first space 58*i*" of the two protrusions 58*g* adjacent to each other provided in the heat absorption fin 58*f* while making contact with both the two protrusions 58*g* making up the "first space 58*i*". Thereafter, the airway member 57*a* passes through "second space 58*i*" different from the "first space 58*i*" while making contact with both the two protrusions 58*g* making up the "second space 58*i*". In the airway member 57*a*, this routing is repeated multiple times. Specifically, the airway member 57*a* may pass multiple times through the space 58*i* of the two protrusions 58*g* adjacent to each other provided in the heat absorption fin 58*f*. For example, the airway member 57*a* may sequentially pass through the space 58*i* of the two protrusions 58*g* adjacent to each other provided in the heat absorption fin 58*f*, in the arranged order. In other words, the airway member 57*a* may pass in a zigzag manner through the space 58*i* of the protrusions 58*g* provided in the heat absorption fin 58*f*. With the airway member 57*a* passing through the space 58*i* of the protrusions 58*g* multiple times, the cooling efficiency of the airflow can be increased.

The liquid ejecting device 11 may be the liquid ejecting device 11 that ejects liquid other than ink. Examples of the state of the liquid ejected from the liquid ejecting device 11 in the form of a very small amount of droplet include granular states, teardrop-shaped states, and thread-like tail-shaped states. Here, the liquid need only be a material that can be ejected from the liquid ejecting device 11. The liquid need only be a substance in the liquid phase, and examples of such liquid include fluids such as high or low viscosity liquids, sols, gel waters, other inorganic solvents, organic solvents, solutions, liquid resins, liquid metals, and metal melts. The liquid includes not only liquid as a state of a substance, but also but also particles of functional materials consisting of solids, such as pigments and metal particles, dissolved, dispersed or mixed in a solvent. Typical examples of the liquid include inks described in the embodiments, and liquid crystals. Here, the ink encompasses various liquid compositions such as general water-based and oil-based inks, gel inks, and hot melt inks. Specific examples of the liquid ejecting device 11 include liquid crystal displays, electroluminescence displays, surface-emitted displays, and devices that eject liquids containing materials, such as electrode materials and color materials used for manufacture of color filters, dispersed or dissolved therein. The liquid ejecting device 11 may be a device for ejecting bioorganic material used in biochip production, a device for ejecting liquid as a sample used as a precision pipette, a textile dyeing device, a micro-dispenser, or the like. The liquid ejecting device 11 may be a device that ejects lubricant with pinpoint accuracy on precision machinery such as watches and cameras, and a device that ejects transparent resin liquid such as UV-curing resin onto substrates to form micro hemispherical lenses, optical lenses, and the like used in optical communication elements and the like. The liquid ejecting device 11 may be a device that ejects acid etchant, alkali etchant or the like for etching substrates and the like.

Technical Ideas and Effects Derived from Embodiments and Modifications

The technical ideas and effects that can be derived from the above-described embodiments and modifications are described below.

(A) A liquid ejecting device includes an ejecting head configured to eject liquid to a medium, a conveyance belt including an adhesive layer to which the medium is bondable, the conveyance belt being configured to convey the medium with the adhesive layer, a heating unit configured to heat the conveyance belt, a pressing unit configured to press the medium against the conveyance belt heated by the heating unit, a channel member configured to define a channel of the liquid to be supplied to the ejecting head, an airflow generation unit configured to generate airflow to be jetted to the conveyance belt past the pressing unit, and a heat exchange mechanism configured to exchange heat between a heat absorption unit configured to absorb heat and a heat dissipation unit configured to emit heat. The heat dissipation unit makes contact with the channel member, and the heat absorption unit is disposed in a course of an airway path through which the airflow moves.

With this configuration, the conveyance belt is heated with the heating unit to bring the conveyance belt and the medium before the printing into intimate contact with each other. When the heat exchange mechanism is used, the temperature of the liquid to be supplied to the ejecting head is increased with the heat dissipation unit of the heat exchange mechanism. Then, after the airflow generated at the airflow generation unit is cooled with the heat absorption unit of the heat exchange mechanism, this airflow is jetted to the conveyance belt in intimate contact with the medium. By depriving the heat for heating the liquid to be supplied to the ejecting head from the airflow to be jetted to the conveyance belt, the conveyance belt can be cooled more than the case where the conveyance belt is cooled with the airflow in the environment where the liquid ejecting device is installed. Thus, the durability of the conveyance belt can be improved.

(B) The liquid ejecting device may include a housing unit including an internal space configured to house the ejecting head and the heat exchange mechanism. The channel member may be in communication with the ejecting head through an inside of the housing unit, the airway path may be configured such that the airflow from the airflow generation unit is sent into the housing unit, and the housing unit may include an outlet configured to blow, to the conveyance belt, the airflow sent into the housing unit.

With this configuration, the heat is exchanged between the heat absorption unit that absorbs heat from the liquid to be supplied to the ejecting head and the heat dissipation unit that emits heat to the airflow to be blown to the conveyance belt, in the internal space of the housing unit. In this manner, the heat is more efficiently exchanged. By blowing, to the conveyance belt, the airflow from which the heat is efficiently emitted, the effect of cooling the conveyance belt can be further improved.

(C) In the liquid ejecting device, when a portion facing the ejecting head in the conveyance belt is an opposing portion, the outlet may be provided downstream of the ejecting head in a movement direction of the opposing portion.

With this configuration, the airflow is jetted to the conveyance belt where printing has been performed on the medium. Since the heat of the conveyance belt in the region where the printing is performed onto the medium is less deprived, the adhesive force of the adhesive layer in the region where printing is performed on the medium is less reduced. In this manner, the conveyance belt can be cooled while ensuring the adhesion between the medium and the conveyance belt in the region where printing is performed on the medium.

(D) In the liquid ejecting device, when a portion facing the ejecting head in the conveyance belt is an opposing portion, the outlet may be provided upstream of the ejecting head in a movement direction of the opposing portion.

With this configuration, the airflow is jetted to the conveyance belt before the printing is performed on the medium. Since the heat of conveyance belt is deprived before the conveyance belt faces the ejecting head, the heat of the conveyance belt less affects the ejecting performance of the ejecting head. For example, clogging of the nozzle due to heat and the like less occur. In this manner, the conveyance belt can be cooled while suppressing defects of the ejecting head.

(E) The liquid ejecting device may include a heat absorption fin including a plurality of protrusions and housed inside the housing unit. The heat absorption fin may be coupled with the heat absorption unit.

With this configuration, with the plurality of protrusions of the heat absorption fin, the surface area of the portion where the heat absorption unit absorbs heat increases than the case where the heat absorption unit is a flat surface, and thus the effect of cooling the conveyance belt can be improved.

(F) In the liquid ejecting device, the airway path may include an airway member configured to define a path through which the airflow moves in the housing unit, and, with the airway member, the airflow may pass through at least one space of spaces between the protrusions adjacent to one another.

With this configuration, the space between the protrusions adjacent to one another includes three surfaces, namely the surface of one protrusion, the surface of the other protrusion and the surface between the two protrusions connecting the surfaces of the two protrusions. The airway member causes the airflow to pass through the space between the protrusions adjacent to one another, and thus the heat absorption unit absorbs the heat of the airflow from the three surfaces. In this manner, the surface area of the portion where the heat is absorbed by the heat absorption unit increases, and thus the effect of cooling the conveyance belt can be improved.

(G) In the liquid ejecting device, the heat absorption unit may be located between the heat dissipation unit and the ejecting head.

With this configuration, since the heat absorption unit is located between the heat dissipation unit and the ejecting head, the heat dissipation unit that emits heat is disposed at a position separated from the ejecting head. For example, the heat emitted from the heat dissipation unit increases the temperature of the nozzle portion of the ejecting head to a temperature equal to or greater than the temperature of the liquid to be supplied. If the temperature of the liquid portion that makes contact with the surface of the nozzle is increased to a temperature equal to or greater than the temperature suitable for ejection, clogging of the nozzle tends occur. That is, with the heat absorption unit located between the heat dissipation unit and the ejecting head, the influence of the heat on the ejecting head can be suppressed.

What is claimed is:

1. A liquid ejecting device comprising:

an ejecting head configured to eject liquid to a medium;

a conveyance belt including an adhesive layer to which the medium is bondable, the conveyance belt being configured to convey the medium with the adhesive layer;

a heating unit configured to heat the conveyance belt;

a pressing unit configured to press the medium against the conveyance belt heated by the heating unit;

a channel member configured to define a channel of the liquid to be supplied to the ejecting head;

an airflow generation unit configured to generate airflow to be jetted to the conveyance belt past the pressing unit; and a heat exchange mechanism configured to exchange heat between a heat absorption unit configured to absorb heat and a heat dissipation unit configured to emit heat, wherein the heat dissipation unit makes contact with the channel member, and the heat absorption unit is disposed in a course of an airway path through which the airflow moves.

2. The liquid ejecting device according to claim 1, further comprising a housing unit including an internal space configured to house the ejecting head and the heat exchange mechanism, wherein the channel member is in communication with the ejecting head through an inside of the housing unit;

the airway path is configured such that the airflow from the airflow generation unit is sent into the housing unit; and the housing unit includes an outlet configured to blow, to the conveyance belt, the airflow sent into the housing unit.

3. The liquid ejecting device according to claim 2, wherein when a portion facing the ejecting head in the conveyance belt is an opposing portion, the outlet is provided downstream of the ejecting head in a movement direction of the opposing portion.

4. The liquid ejecting device according to claim 2, wherein when a portion facing the ejecting head in the conveyance belt is an opposing portion, the outlet is provided upstream of the ejecting head in a movement direction of the opposing portion.

5. The liquid ejecting device according to claim 2, further comprising a heat absorption fin including a plurality of protrusions and housed inside the housing unit, wherein the heat absorption fin is coupled with the heat absorption unit.

6. The liquid ejecting device according to claim 5, wherein the airway path includes an airway member configured to define a path through which the airflow moves in the housing unit; and the airway member causes the airflow to pass through at least one of spaces between the protrusions adjacent to one another.

7. The liquid ejecting device according to claim 2, wherein the heat absorption unit is located between the heat dissipation unit and the ejecting head.

* * * * *